United States Patent
Hodgson et al.

(12) 
(10) Patent No.: US 6,282,334 B1
(45) Date of Patent: Aug. 28, 2001

(54) LARGE SCALE WDM/TDM SENSOR ARRAY EMPLOYING ERBIUM-DOPED FIBER AMPLIFIERS

(75) Inventors: Craig W. Hodgson, Thousand Oaks; Benjamin J. Vakoc, San Mateo, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/311,007

(22) Filed: May 13, 1999

(51) Int. Cl.[7] ............................... G02B 6/00; G01J 1/04; H01S 3/00

(52) U.S. Cl. ............................ 385/12; 385/15; 385/16; 385/24; 385/31; 250/227.14; 250/227.18; 250/227.19; 359/341; 359/123; 359/127; 359/135; 359/137

(58) Field of Search ............................ 385/12, 13, 15, 385/16, 24, 31, 141; 250/227.14, 227.18, 227.19; 359/341, 123, 127, 135, 136, 137

(56) References Cited

U.S. PATENT DOCUMENTS

| | | | |
|---|---|---|---|
| 5,696,857 | * 12/1997 | Frederick | 385/12 |
| 5,796,504 | 8/1998 | Sonderegger et al. | 359/144 |
| 5,866,898 | 2/1999 | Hodgson et al. | 250/277.14 |
| 6,034,924 | * 3/2000 | Vakoc | 367/149 |
| 6,040,571 | * 3/2000 | Hodgson et al. | 250/227.14 |
| 6,084,233 | 7/2000 | Hodgson et al. | 250/227.14 |
| 6,097,486 | * 8/2000 | Vakoc et al. | 356/345 |

FOREIGN PATENT DOCUMENTS

WO 98/02898   2/1998   (WO) ............... 385/12 X

OTHER PUBLICATIONS

Jefferson L. Wagener, et al. *Novel Fiber Sensor Arrays Using Erbium–Doped Fiber Amplifiers*, Journal of Lightwave Technology, vol. 15, No. 9, Sep. 1997, pp. 1681–1688.

A.D. Kersey, et al., 64–elementary time–division multiplexed interferometric sensor array with EDFA telemetry, *OFC '96 Technical Digest*, 1996 pp. 270–271.

Alan D. Kersey, A Review of Recent Developments in Fiber Optic Sensor Technology, *Optical Fiber Technology*, vol. 2, 1992, pp. 291–317.

Jefferson L. Wagener, Erbium Doped Fiber Sources and Amplifiers for Optical Sensors, Stanford University Ph.D. Thesis, Mar. 1996, pp. 1–150.

Joar Saether, et al., Optical Amplifiers in Multiplexed Sensor Systems—Theoretical Prediction of Noise Performance, *Proceedings 11Optical Fibre Sensor Conference*, Sapporo, May 21–21, 1996, pp. 518–521.

(List continued on next page.)

*Primary Examiner*—Brian Healy
(74) *Attorney, Agent, or Firm*—Knobbe, Martens, Olson & Bear, LLP

(57) ABSTRACT

An acoustic array includes amplifiers and sensor subarrays, both of which are placed along rungs that connect a return distribution bus with both a signal distribution bus and a pump distribution bus. By placing the amplifiers along the rungs, separate buses can be used for distributing the optical signal and the pump energy for the amplifiers, thereby facilitating the use of standardized couplers. Time division multiplexed sensor subarrays are advantageously connected to unique combinations of laser signal sources and signal return buses, in which the laser signal sources generate different optical wavelengths that are multiplexed on the signal return buses. Optical sources include intensity modulators on either side of an amplifier to eliminate extraneous noise between optical pulses. In addition, amplified spontaneous emission (ASE) filters may be advantageously used to reduce optical noise at wavelengths other than those of interest.

42 Claims, 27 Drawing Sheets

OTHER PUBLICATIONS

G. Wang, et al., Digital demodulation and signal processing applied to fiber Bragg grating strain sensor arrays in monitoring transient loading effects on ship hulls, *12th International Conference on Optical Fiber Sensors*, vol. 16, Oct. 28–31, 1997, pp. 612–615.

A.R. Davis, et al., 64 Channel All Optical Deployable Acoustic Array, *12th International Conference on Optical Fiber Sensors*, vol. 16, Oct. 28–31, 1997, pp. 616–619.

Ralph Posey, Jr., et al., Low–Coherence, Wavelength–Encoded Addressing of Integrated Long–Gauge Length Fiber Optic Strain Sensing, *12th International Conference on Optical Fiber Sensors*, vol. 16, Oct. 28–31, 1997, pp. 574–576.

Joar Saether, et al., Noise Performance of Multiplexed Fiber–Optic Sensor Systems with Optical Amplifiers, *Optical Review*, vol. 4, No. 1A, Jan.–Feb. 1997, pp. 138–144.

TB2500–CB Tracking Filter and Controller, JDS Fitel Inc., catalog, 1997, 2 pages.

TB2500–M Series Tunable Fabry–Perot Etalon Filters, JDS Fitel Inc., catalog, 1997, 2 pages.

TB2500–EC Fabry–Perot Etalon Filter Controller, JDS Fitel Inc., catalog, 1997, 2 pages.

TB1500–B/C/D Tunable Bandpass Filter, JDS Fitel Inc., catalog, 1997, 2 pages.

Amplified Spontaneous Emission Noise Rejection Filter (ASEF), E–Tek Dynamics, 19999 Product Catalog, p. 37.

* cited by examiner

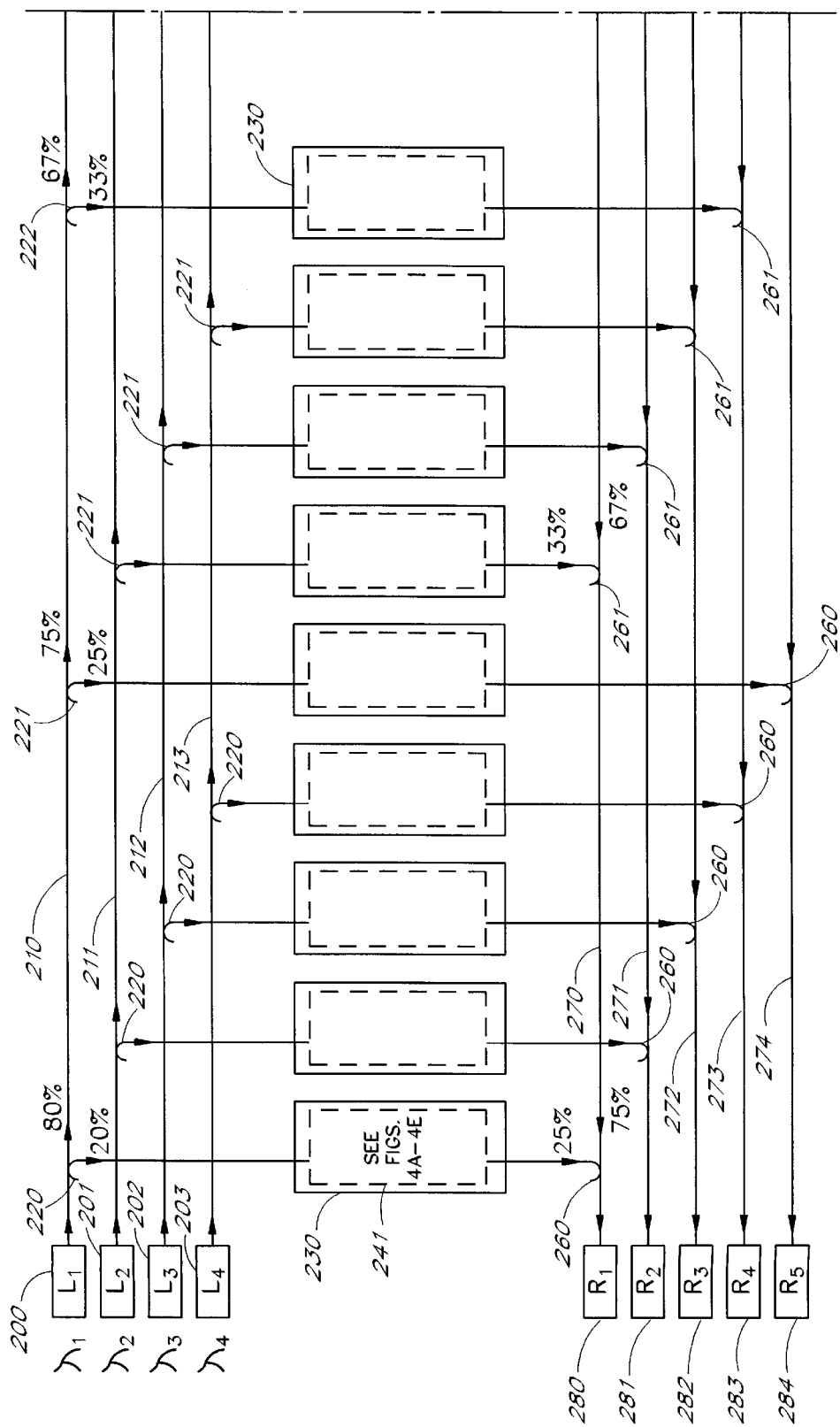

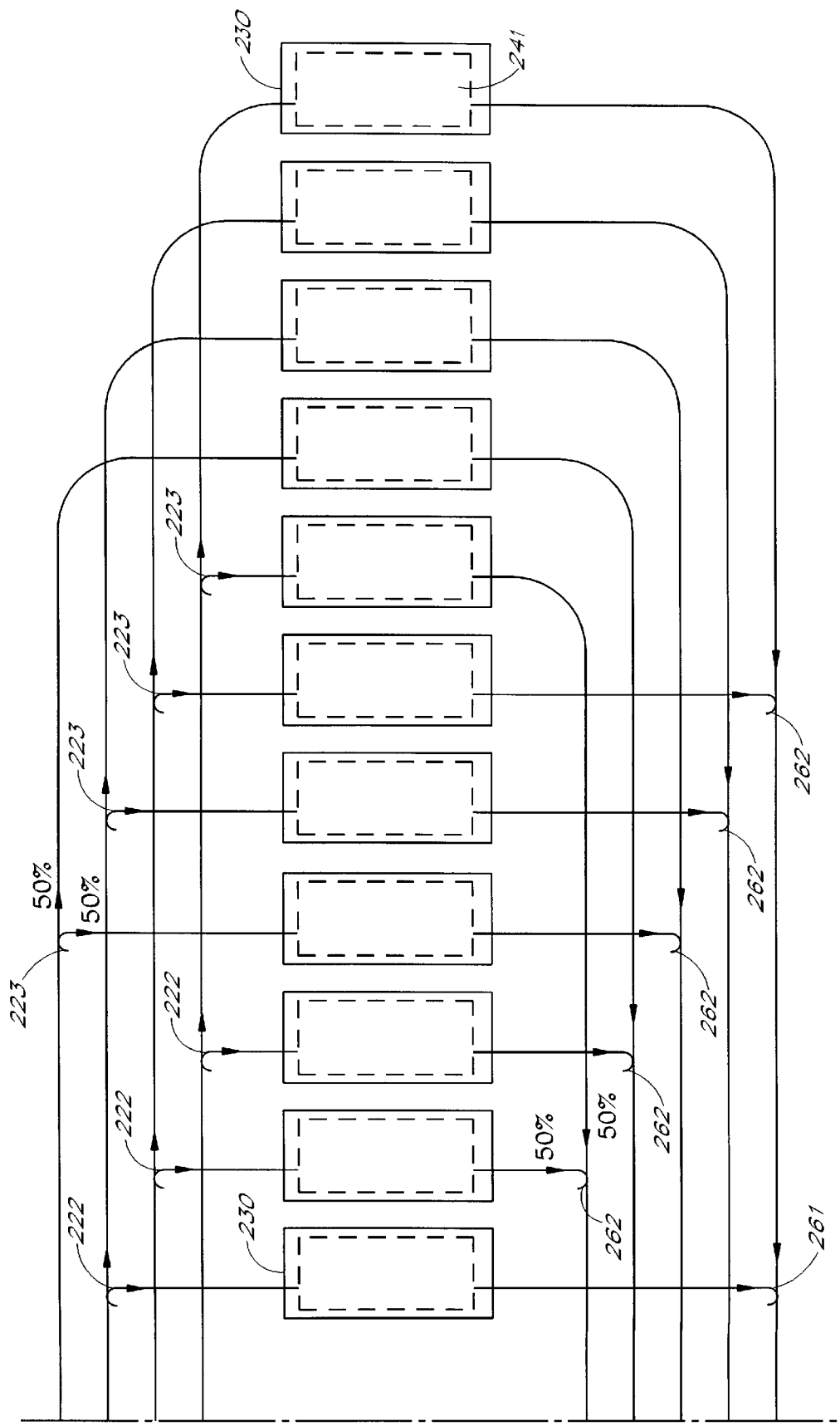

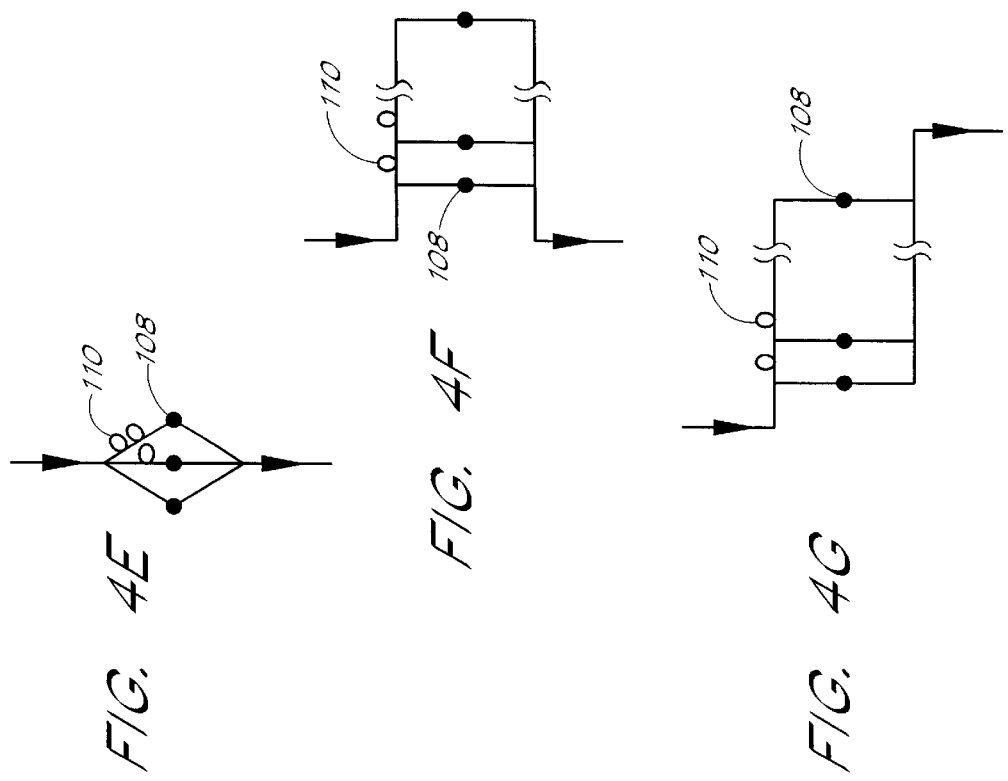
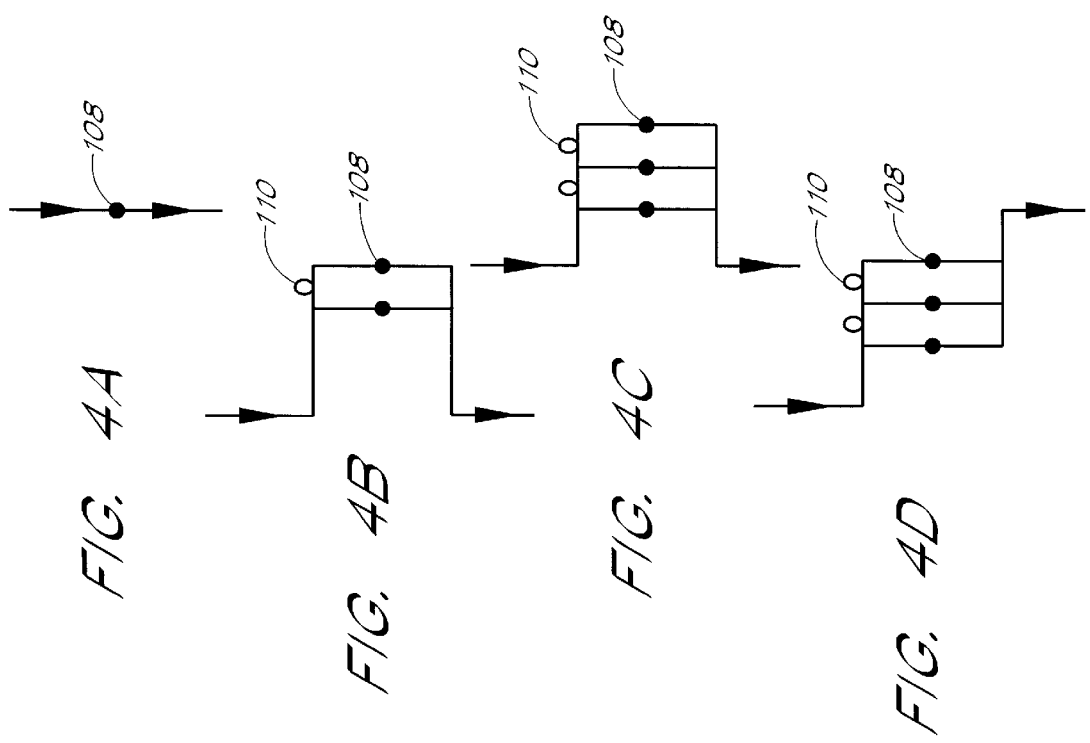

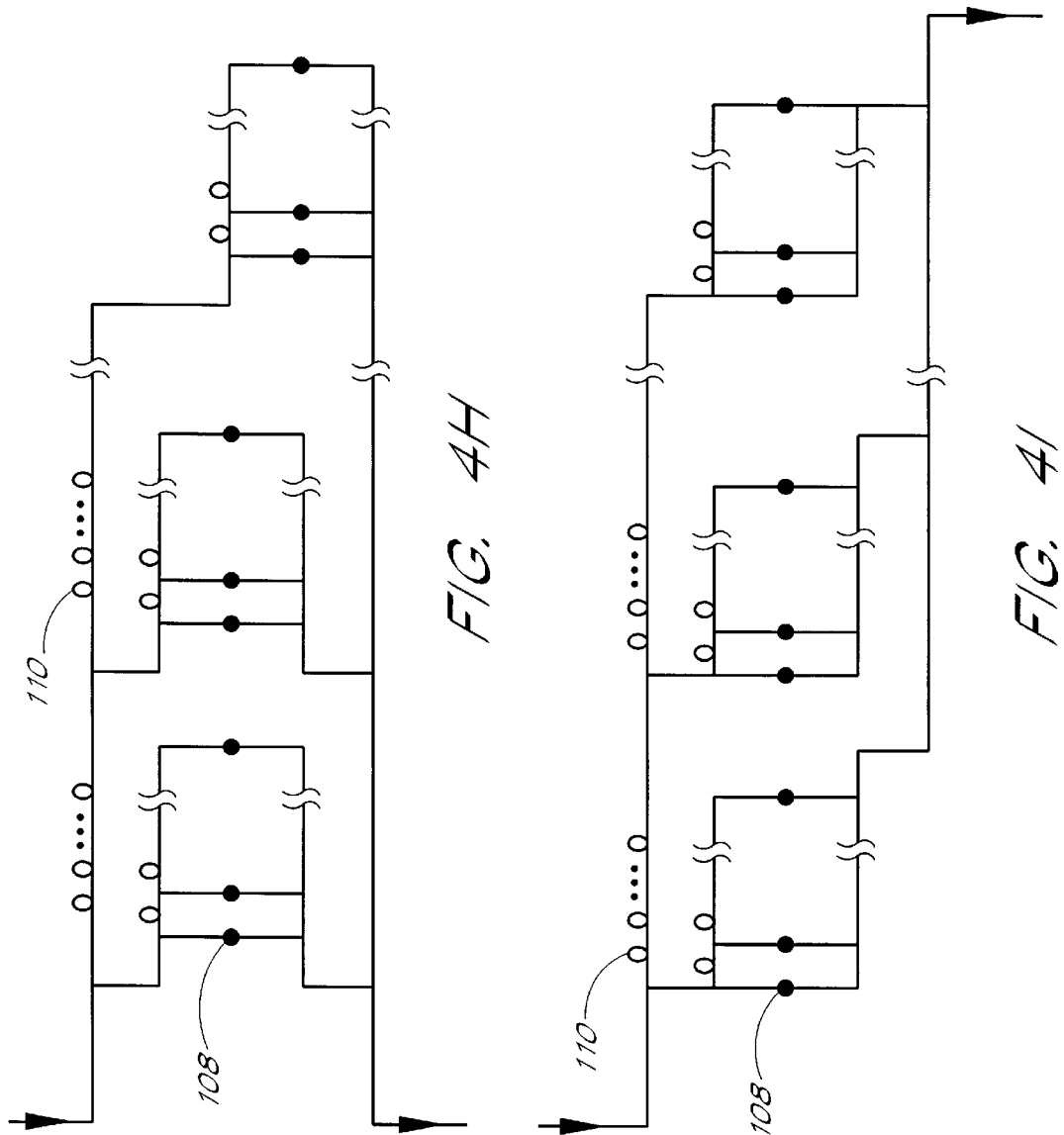

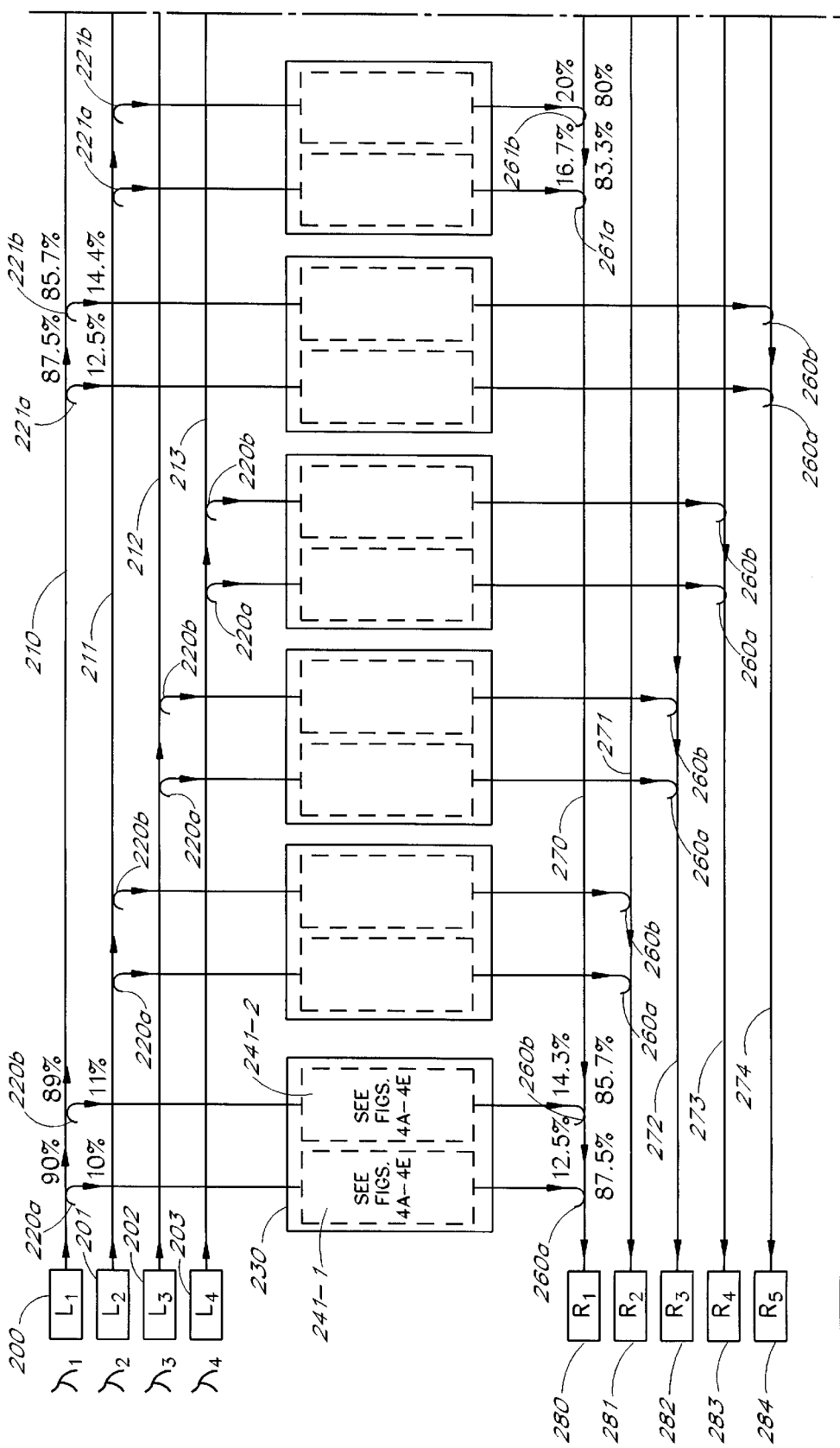

US 6,282,334 B1

LARGE SCALE WDM/TDM SENSOR ARRAY EMPLOYING ERBIUM-DOPED FIBER AMPLIFIERS

BACKGROUND OF THE INVENTION

1. Field of the Invention

The present invention relates generally to sensor arrays for sensing systems, e.g., acoustic sensing systems.

2. Description of the Related Art

Arrays of fiber optic interferometric sensors show promise in applications where size, electrical interference, and electromagnetic detection make electronic sensors impractical. Such interferometric sensors are capable of measuring a parameter (i.e., a measured) with a very high dynamic range (e.g., 120 dB). Optical sensor arrays are formed by connecting a plurality of sensors using fiber optic lines. If each sensor in an array requires a dedicated fiber to carry the detection signal, the large number of fibers required quickly becomes unwieldy as the number of sensors increases.

Optical couplers are commonly used to couple optical signals from a distribution bus to the sensors, and from the sensors to a return bus. In an array in which amplifiers are not used to periodically boost the signal strength, delivering sufficient optical signal to each of the sensors may be problematic if the number of sensors is too great. In addition, there may be significant variations in the optical power levels returned to the detectors, thereby complicating the signal processing.

Although significant progress has been made in recent years with respect to the sophistication of sensor array configurations and signal processing techniques, there is still need for improved architectures based on standardized components such as 1×2 or 1×4 couplers, in which the return optical signals have respective powers within a relatively narrow range.

SUMMARY OF THE INVENTION

One preferred embodiment of the invention is a sensor array that includes a plurality of distribution fiber lines for distributing respective input optical signals. The respective input optical signals have different wavelengths. A plurality of return fiber lines return perturbed optical signals. A plurality of sensor subarrays have respective inputs and outputs. Each of the subarrays includes a plurality of sensors that receive the input optical signals and that output the perturbed optical signals. Each of the inputs is coupled to one of the distribution fiber lines. Each of the outputs is coupled to one of the return lines. Each of the subarrays is coupled to a unique combination of distribution and return fiber lines.

Another preferred embodiment is a sensor array that includes a plurality of distribution fiber lines for distributing respective input optical signals. The respective input optical signals have different wavelengths. A return fiber line returns perturbed optical signals. A plurality of sensor subarrays have respective inputs and outputs. Each of the subarrays includes a plurality of sensors that receive the input optical signals and output the perturbed optical signals. Each of the inputs is coupled to one of the distribution fiber lines. Each of the outputs is coupled to the return line. Each of the subarrays is coupled to a unique distribution fiber line.

Yet another embodiment is a method of distributing an input optical signal to a plurality of sensors. The method provides a first plurality of sensors having respective inputs and outputs; connects a first plurality of input couplers to the inputs of the sensors via respective optical amplifiers; connects the input couplers to a first distribution fiber line which carries an input optical signal; connects a first plurality of output couplers to the outputs of the sensors; connects the output couplers to a first return fiber line; and amplifies the input optical signal provided to the inputs of the sensors to compensate for reduced optical power.

Yet another preferred embodiment is an optical sensor architecture that includes a plurality of sensors which receive an input optical signal and which output perturbed optical signals. A distribution bus is coupled to each sensor to distribute the input optical signal to each sensor. A return bus is coupled to each sensor to receive the perturbed optical signal from each sensor to be included as a portion of a return signal. A plurality of optical amplifiers are interposed between the distribution bus and the sensors to increase the power provided to each of the sensors. In this preferred embodiment, each of the optical amplifiers may be coupled to an array of sensors, e.g., 4–32 sensors.

Still another preferred embodiment is an optical sensor architecture that includes a plurality of means for sensing a parameter; means for distributing a first optical signal to each of the means for sensing; means for returning a second optical signal from each of the means for sensing; and a plurality of means for amplifying the first optical signal. The amplifying means is located between the means for sensing and the means for distributing.

Another preferred embodiment is a method of distributing an input optical signal to a plurality of sensors in a sensor architecture to generate an optical output. The method couples an input optical signal from a distribution bus to a plurality of sensors; amplifies the input optical signal after the input optical signal leaves the distribution bus but before the input optical signal enters the plurality of sensors; generates output signals from the plurality of sensors; and couples the output signal from each sensor into a return signal carried via a return bus which is coupled to each sensor.

Still another preferred embodiment is an optical sensor array architecture that includes a distribution bus which receives and distributes an optical input signal. A return bus receives a plurality of optical return signals and provides the optical return signals as output signals. A plurality of rungs are coupled between the distribution bus and the return bus. Each of the rungs comprises at least one sensor which receives a respective portion of the optical input signal and which generates one of the optical return signals. A plurality of input optical amplifiers in the rungs are responsive to a pump signal. The input optical amplifiers amplify the optical input signal in the rungs to compensate for reduced signal power.

A further preferred embodiment is a modulator for an optical signal that includes a first intensity modulator that receives and modulates an optical signal. The first intensity modulator produces intensity modulated output in the form of output pulses. An optical amplifier receives and amplifies the modulated output. A second intensity modulator receives the amplified modulated output. The second intensity modulator modulates the amplified modulated output by substantially eliminating optical noise produced by the amplifier during time intervals between the optical pulses.

Another preferred embodiment is a sensor array that includes a first optical source and a second optical source that generate respective first and second optical signals at respective first and second wavelengths. The first and second wavelengths are different. First and second optical amplifiers receive the first and second optical signals, respectively. The first and second amplifiers amplify the first and second optical signals, respectively. First and second bandpass filters receive the first and second amplified optical signals, respectively. The first bandpass filter filters out optical radiation generated by the first amplifier that is near the second wavelength. The second bandpass filter filters out optical radiation generated by the second amplifier that is near the first wavelength. The first and second bandpass filters generate first and second filtered optical signals, respectively. First and second sensors receive the first and second optical signals, respectively. The first and second sensors output first and second perturbed optical signals in response to a stimulus. A return bus receives perturbed, filtered first and second optical signals and directs the first and second perturbed optical signals towards a receiver unit.

Yet another preferred embodiment is a sensor array that includes a first optical source and a second optical source that generate respective first and second optical signals at respective first and second wavelengths. The first and second wavelengths are different. First and second optical amplifiers receive the first and second optical signals, respectively. The first and second amplifiers amplify the first and second optical signals to generate first and second amplified optical signals, respectively. First and second sensors receive the first and second amplified optical signals, respectively. The first and second sensors output first and second amplified perturbed optical signals in response to a stimulus. A return bus receives the first and second perturbed optical signals and directs the first and second perturbed optical signals towards a receiver unit. A first bandpass filter is located in the sensor array between the first amplifier and the return bus. A second bandpass filter is located in the sensor array between the second amplifier and the return bus. The first filter filters out optical radiation generated by the first amplifier that is near the second wavelength, and the second filter filters out optical radiation generated by the second amplifier that is near the first wavelength.

Still another preferred embodiment is an optical sensor architecture that includes a plurality of sensor groups. Each sensor group includes at least one sensor which receives an input optical signal and which outputs a perturbed optical signal. A distribution bus is coupled to each sensor group to distribute the input optical signal to each sensor group. The distribution bus distributes a pump signal. A return bus is coupled to each sensor group to receive the perturbed optical signal from each sensor group. A plurality of rungs connect the distribution bus and the return bus, with the sensor groups being disposed along the rungs. A plurality of optical amplifiers are distributed at selected positions along the rungs. The amplifiers receive the pump signal and maintain the power of the input optical signal at an adequate level for each sensor group.

BRIEF DESCRIPTION OF THE DRAWINGS

FIGS. 2, 2a, 2b illustrates an embodiment of the invention in which time division multiplexed sensor subarrays are connected to respective unique combinations of a laser signal source and a signal return bus, with the laser signal sources generating different optical wavelengths that are multiplexed on the respective signal return buses.

FIGS. 4A–4J illustrate in greater detail a number of configurations for a sensor subarray.

FIGS. 7, 7a–c illustrates an embodiment of the invention similar to that shown in FIG. 3, in which each sensor subarray comprises a plurality of sensor groups.

DETAILED DESCRIPTION OF THE PREFERRED EMBODIMENTS

Figure 1A:
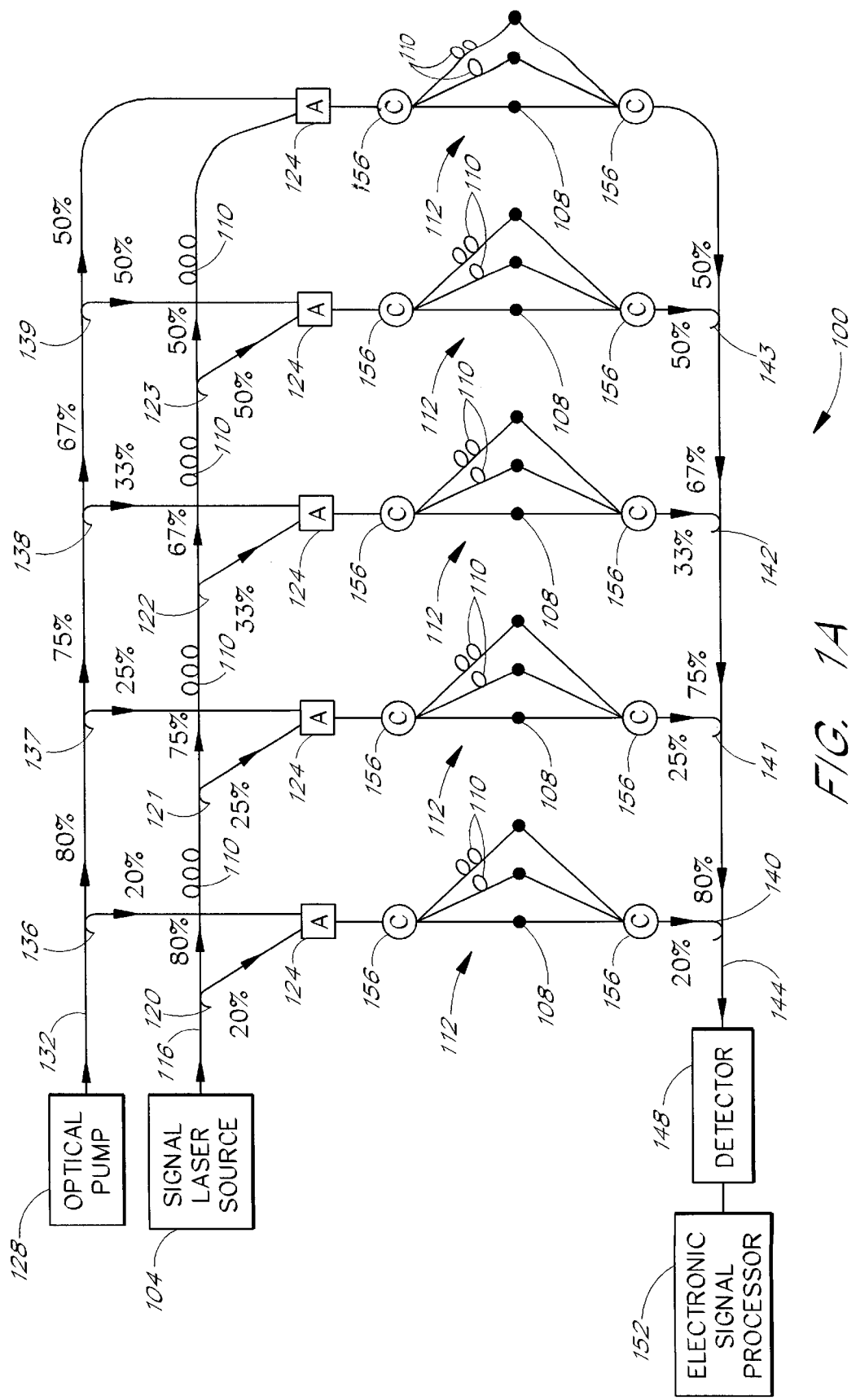
FIGS. 1A–1F illustrate embodiments of the invention in which optical amplifiers and time division multiplexed sensor subarrays are placed along rungs that connect a return distribution bus with both a signal distribution bus and a pump distribution bus.
Figure 1B:
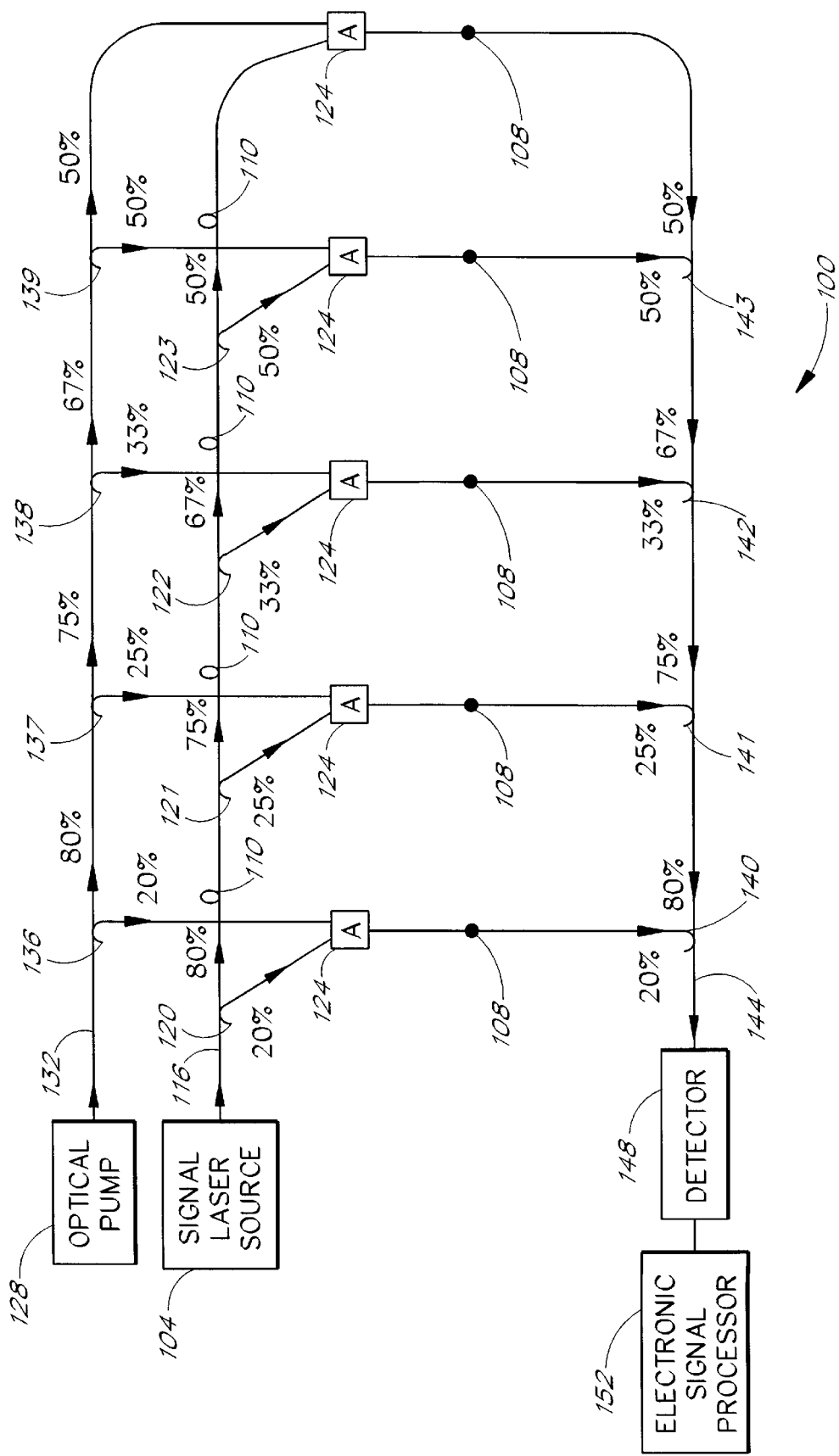

One embodiment of a sensing system 100 in accordance with the present invention is shown in FIG. 1A. Although described herein with respect to acoustic sensing, it will be appreciated that the embodiments herein may be applied to other sensing systems. A laser signal source 104 generates an optical signal which serves as the input optical signal for a plurality of sensors 108 which may be arranged in the form of sensor subarrays 112 comprising a plurality of sensors, e.g., 2–32 sensors. For some applications, the respective sensor subarrays 112 may comprise a single sensor 108, as illustrated in FIG. 1B. The sensors of the embodiments disclosed herein may be, for example, Mach-Zehnder or Michelson interferometers. The input optical signal propagates along a signal distribution bus 116 along which are distributed a plurality of couplers 120, 121, 122, 123, which direct respective portions of the optical signal from the distribution bus towards the sensors 108. A plurality of delay coils 110 may be advantageously distributed throughout the sensor subarrays 112 and along the signal distribution bus 116, as illustrated in FIG. 1A, so that the optical signals are properly time division multiplexed throughout the sensing system 100. In the embodiment of FIG. 1B, only one delay coil 110 is needed between adjacent couplers 120, 121, 122, 123, since there is only one sensor 108 per rung.

If five sensor subarrays 112 are utilized, as in the example illustrated in FIG. 1A, then the couplers that are further removed (in the optical path sense) from the signal source 104 will direct greater fractions of the remaining input optical signal towards the sensors 108. This is illustrated in FIGS. 1A and 1B (as well as in FIGS. 1C–1D and 1E–1F discussed below), in which the coupler fraction increases from 20% (coupler 120) to 25% (coupler 121), 33% (coupler 122), and 50% (coupler 123), respectively. No coupler is needed for the most distal subarray 112, and 100% of the optical signal remaining in the signal distribution bus 116 is directed towards this remaining subarray. It should be understood that the illustrated coupler percentages cause approximately 20% of the initial input optical signal to be coupled to each subarray 112.

Since a practical acoustic sensing system typically includes many sensors 108 distributed over many kilometers, it may be necessary to periodically boost the strength of the input optical signal with optical amplifiers, such as erbium-doped fiber amplifiers (EDFA), which may be advantageously spliced into the acoustic sensing system 100. In the embodiment of FIG. 1A, a respective optical amplifier 124 is located between each coupler 120, 121, 122, 123 and the respective sensor subarray 112. The amplifiers 124 are pumped with an optical pump 128 which distributes pump energy to the sensors 108 via a pump distribution bus 132 and a plurality of couplers 136, 137, 138, 139 which function much like their counterparts in the signal distribution bus 116 (i.e., couplers 120, 121, 122, 123). The coupling fractions of the couplers 136, 137, 138, 139 likewise increase with increasing optical distance from the optical pump 128, so that substantially equal power is distributed to each of the amplifiers 124. Each of the amplifiers 124 generally includes a segment of doped fiber as well as a coupling element for coupling the optical pump into the doped fiber without obstructing the flow of light at the signal wavelength.

By using separate signal and pump distribution buses 116 and 132, the individual couplers 120–123 and 136–139 do not each need to operate at both the optical pump wavelength and the signal laser source wavelength. In various embodiments of the invention disclosed herein, the couplers on the signal distribution bus and the couplers on the pump distribution bus are dedicated for use in either the standard signal band or the standard pump band. Thus, standard couplers (such as fused bitapered couplers) may be used instead of custom couplers. By way of contrast, if outputs from the optical pump 128 and the signal source 104 were to propagate along the same bus, and optical amplifiers were distributed along the bus in a serial fashion, then couplers would be needed which perform two functions (i.e., such a coupler would have to pass unused pump light from one amplifier onto the next amplifier as well as split off signal light towards the sensors according to a specified coupling ratio). Such custom couplers are expensive and tend to have higher optical loss than standard couplers, leading to reduced system performance.

The optical pump 128 is remotely located from the amplifiers 124, which affects the number of amplifiers that can be used and affects the placement of the amplifiers. A modest amount of pump power is required by each amplifier 124, whereas the signal power budget and the noise power budget determine the gain and signal output power required from each amplifier 124.

The amount of pump power that can be directed into a pump distribution fiber at the shore end is limited by the cost of the optical pump sources and by nonlinear optical effects that limit input power levels. The amount of power that reaches the amplifiers is further limited by the optical loss of the pump distribution bus and by the splitting and excess losses of the pump distribution network. Thus, the gain/signal output power requirements set the required pump power level that must be delivered to each amplifier. On the other hand, the nonlinear effects and the pump distribution network loss set an upper limit to the amount of pump power that can be delivered to any given amplifier. The ratio of this upper limit to the pump power required for each amplifier determines the number of amplifiers that can be pumped by a single pump distribution bus. Therefore, reducing the pump required by each amplifier and/or increasing the pump power delivered by such pump distribution bus increases the number of amplifiers that can be pumped relative to the number of fibers in the system, which tends to reduce the cost of the system.

The input optical signal is perturbed in the sensors 108 (and the sensors of the other embodiments disclosed herein) in response to stimuli (e.g., acoustical stimuli), with the resulting output signals from the sensors 108 being coupled via couplers 140, 141, 142, 143 to the return bus 144. The coupling fractions of the couplers 140, 141, 142, 143 are chosen so that the relative strengths of the return (output) perturbed optical signals are roughly equal to each other, as indicated by the percentages in FIG. 1A. The output optical signals are detected by a detector 148. The output of the detector 148 is fed to an electronic signal processor 152.

The sensors 108 have inputs and outputs which, in the embodiment of FIG. 1A, are tied to star couplers 156. The star couplers 156 at the inputs of the sensor subarrays 112 are in turn connected to the amplifiers 124 and the distribution bus couplers 120, 121, 122, 123, respectively. The star couplers 156 at the outputs of the sensor subarrays 112 are connected to the return bus couplers 140, 141, 142, 143, respectively. The optical fibers connecting the sensors 108 within each subarray 112 are selected to have different lengths (e.g., delay coils 110 may be used), so that the output optical signals from the sensors are time division multiplexed within the return bus 144. However, other multiplexing arrangements such as code division multiplexing may be used.

Placing the amplifiers 124 between the couplers 120, 121, 122, 123 and the sensors 108 facilitates the use of separate signal distribution and pump distribution buses 116 and 132, since the input optical signal and the pump energy can be input separately to the amplifiers 124. Although the signal distribution bus 116 and the pump distribution bus 132 may share the same fiber line, using dedicated fiber lines for each of these buses 116 and 132, as in the embodiment of FIG. 1A, offers the advantage of being able to use standard couplers (120, 121, 122, 123 and 136, 137, 138, 139), each of which is dedicated for use at a single wavelength. Otherwise, wavelength discriminating couplers must be used, which are considerably more expensive.

Figures 1C, 1D:
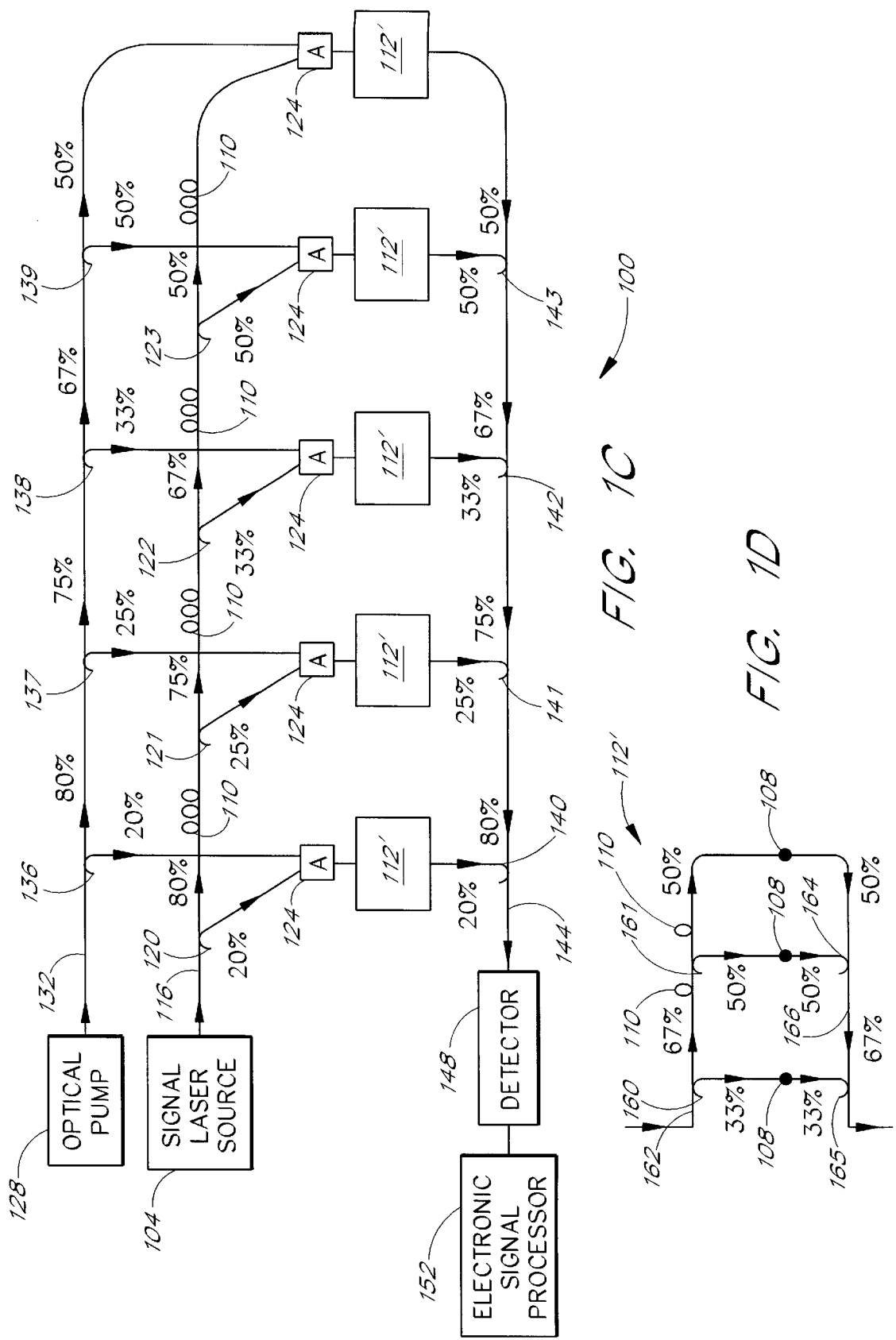
Figures 1E, 1F:
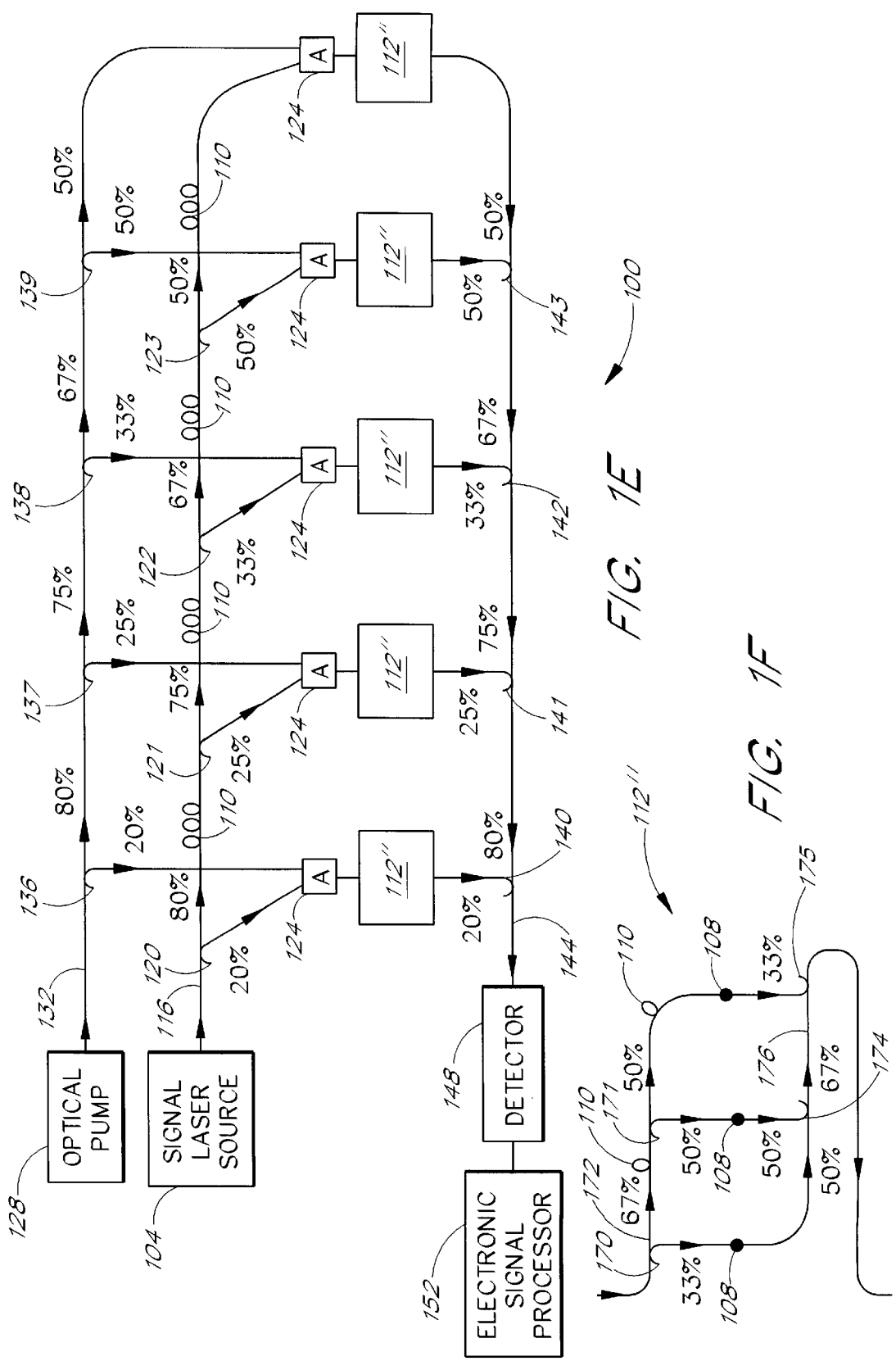

The subarrays 112 may be star coupled arrays as indicated in FIG. 1A, or alternatively, ladder network arrays may be used as illustrated in FIGS. 1C–1D and 1E–1F. FIGS. 1C–1D illustrate a ladder network array 112' that is of the feed backward type, whereas the ladder network array 112" in FIGS. 1E–1F is of the feed forward type. The embodiments of FIGS. 1C–1D and 1E–1F are otherwise analogous to the embodiment of FIG. 1A. The ladder network array 112' (FIG. 1D) includes couplers 160, 161 on a ladder distribution bus 162 and couplers 164, 165 on a ladder return bus 166. Likewise, the ladder network array 112" (FIG. 1F) includes couplers 170, 171 on a ladder distribution bus 172 and couplers 174, 175 on a ladder return bus 176. Delay coils 110 are distributed throughout the subarrays 112' and 112" so that the optical signals are properly time division multiplexed.

Another embodiment in accordance with the present invention is shown in FIG. 2. A plurality of laser signal sources 200, 201, 202, 203 generate respective optical signals at different wavelengths. The optical signals are distributed along respective signal distribution buses 210, 211, 212, and 213. Couplers 220, 221, 222, 223 (which may be standard couplers) distributed along the buses 210–213 direct respective fractions of the optical signals towards a plurality of sensor subarrays 230, each of which comprises a sensor group 241. The sensor group 241 may comprise a single sensor 108 (as illustrated in FIG. 4A discussed below), or a plurality of sensors arranged in a subarray (as illustrated in FIGS. 4B–4E discussed below). Each sensor 108 has an input end and an output end, with the respective ends coupled to star couplers 250 (or to a ladder coupling arrangement, such as those illustrated in FIGS. 1D and 1F, and FIGS. 4B, 4C, 4D), which in turn are coupled to the couplers 220, 221, 222, 223 (along the signal distribution buses 210–213) as well as to the couplers 260, 261, 262 (along return signal buses 270, 271, 272, 273, 274). Perturbed optical signals from the sensors 108 are detected by a receiver unit comprising a plurality of receivers 280, 281, 282, 283, 284, each of which may, for example, include an optical demultiplexer, detectors and an electronic signal processor. As in the embodiments of FIGS. 1A–1F, the sensors 108 modify (perturb) the input optical signals as a result of acoustic or other perturbations.

Figure 10A:
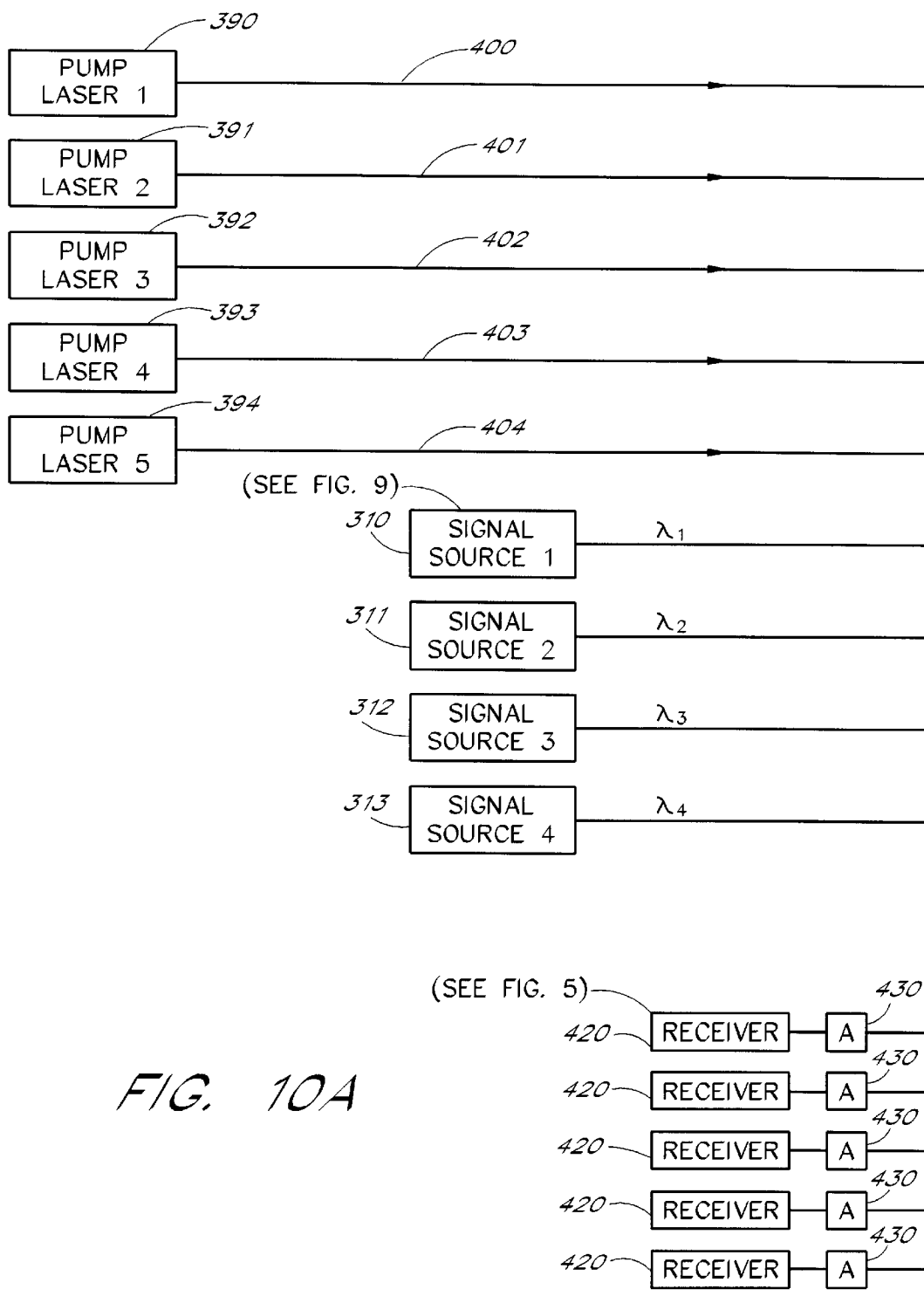
FIGS. 10, 10a–d illustrates an embodiment in which λ-add filters are used on the return bus.
Figure 10:
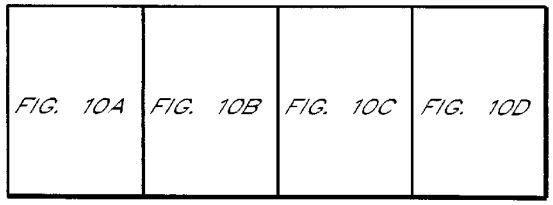
Figure 10B:
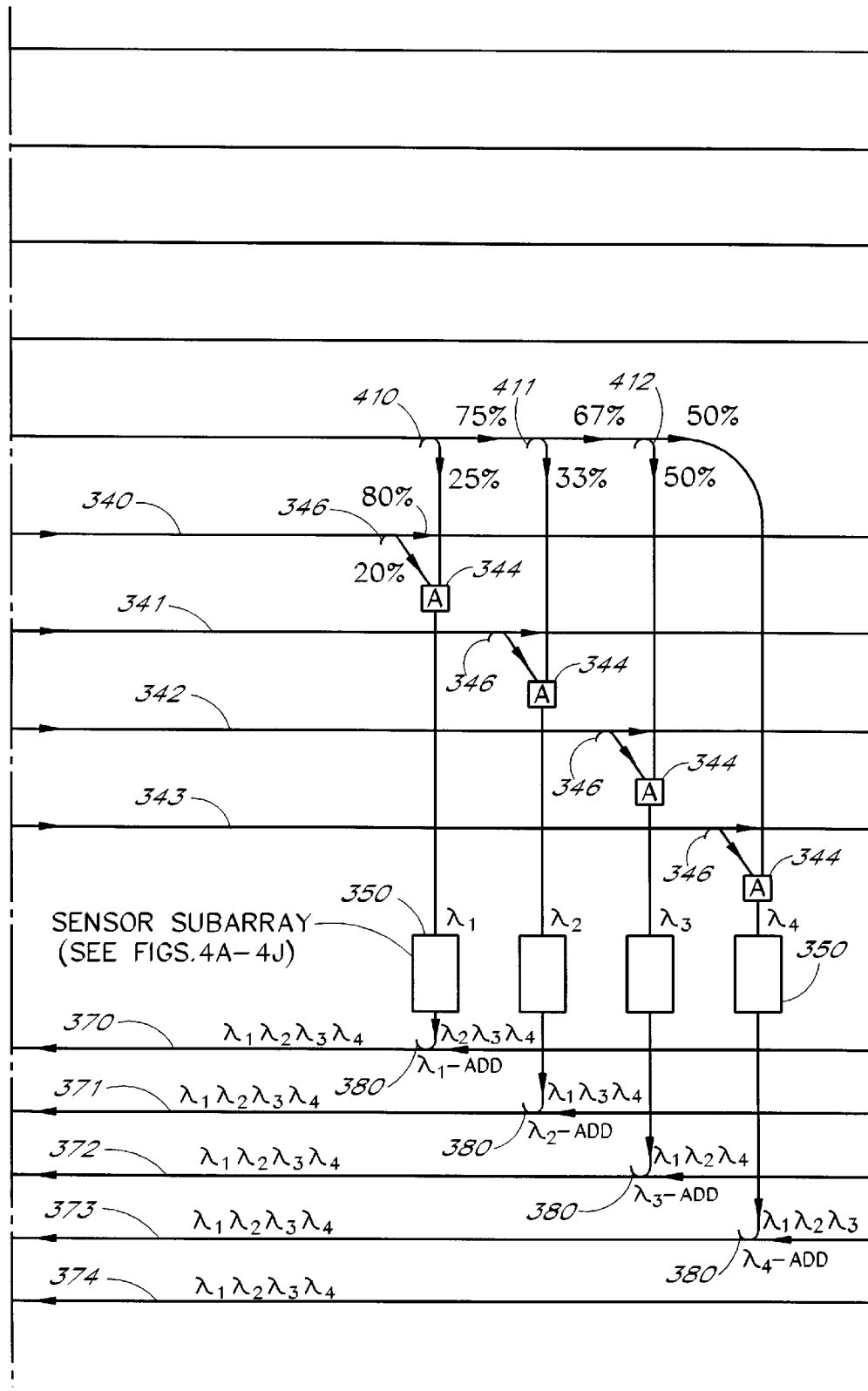
Figure 10C:
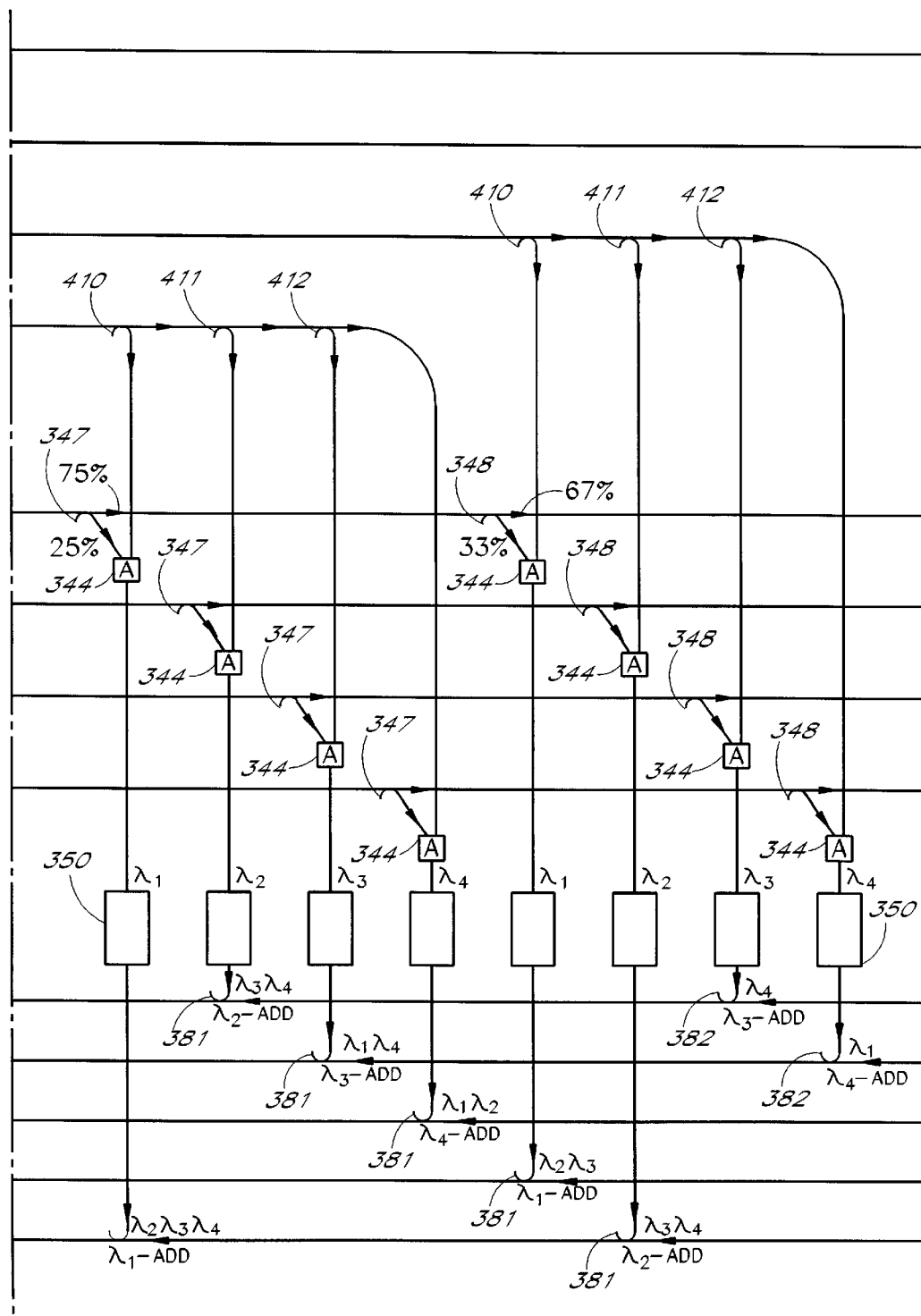
Figure 10D:
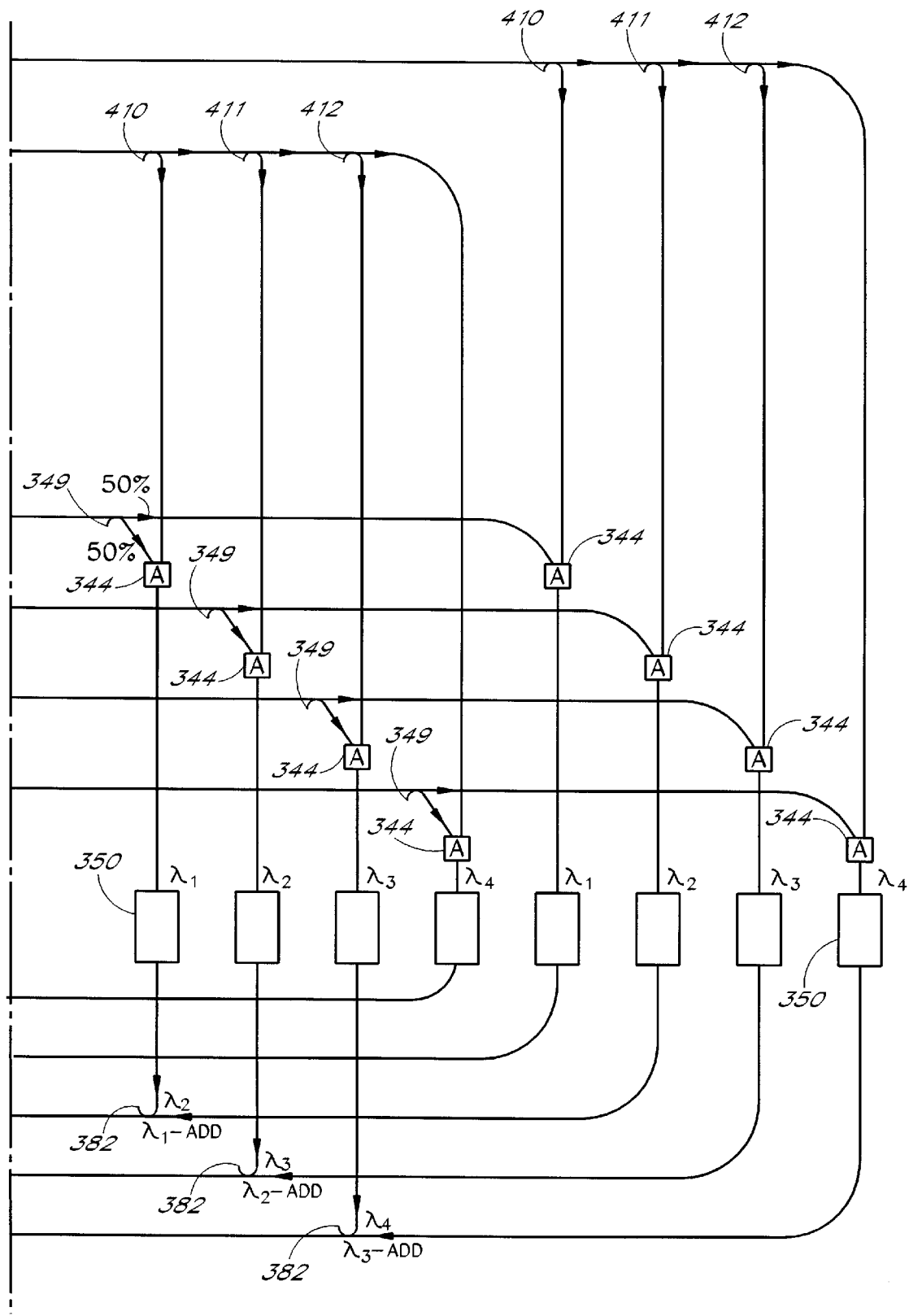

Although the couplers 260, 261, 262 may be standard couplers such as fused bitapered couplers, they may alternatively be WDM couplers (in which light at two different wavelengths propagating along respective fibers is coupled onto a common fiber). As a further alternative, they may be dense wavelength division multiplexing (DWDM) couplers (in which the various wavelengths corresponding to the signal sources 200, 201, 202, 203 are efficiently multiplexed onto the return signal buses 270, 271, 272, 273, 274) such as λ-add couplers (as illustrated in FIG. 10 below). Although they are more expensive, DWDM couplers offer the advantage of lower insertion loss. As used herein, signals of different wavelengths means signals that can be separated by optical means. (Currently, the industry standard is 100 GHz spacing between wavelengths, corresponding to 0.8 nm at 1550 nm. However, 1 GHz spacing corresponding to 0.008 nm at 1550 nm has also been demonstrated. Further, it is common in the industry to employ 16 or more DWDM wavelength channels, and a system with more than 128 wavelength channels has been demonstrated.)

The sensors 108 within the sensor subarrays 230 are preferably arranged so that the respective lengths of optical fiber linking them to the star couplers 250 are sufficiently different that the perturbed optical signals from the sensors within each subarray can be resolved from each other, i.e., the optical signal is time division multiplexed within each subarray (they are sufficiently separated in time that code division multiple access (CDMA) is possible). Further, in the embodiment of FIG. 2, adjacent subarrays 230 are preferably coupled to signal sources 200–203 of different wavelengths and to different return signal buses 270–274, so that the return perturbed optical signals are wavelength division multiplexed within the return signal buses (see, for example, FIG. 6 below). For example, the return signal bus 270 carries return signals of each of the optical wavelengths generated by the signal sources 200–203. The receivers 280–284 preferably include demultiplexing elements so that the various optical wavelengths can be demultiplexed. Thus, one aspect of the preferred embodiment as illustrated in FIG. 2 is that each sensor subarray 230 is coupled to a unique combination of signal source (200–203) and return signal bus (270–274). One advantage of the embodiment of FIG. 2 is that by incorporating time division multiplexing and wavelength division multiplexing in the same system, a greater number of sensors 108 can be integrated into a single acoustic sensing system for a given number of fibers, as compared with the prior art.

Figure 6:
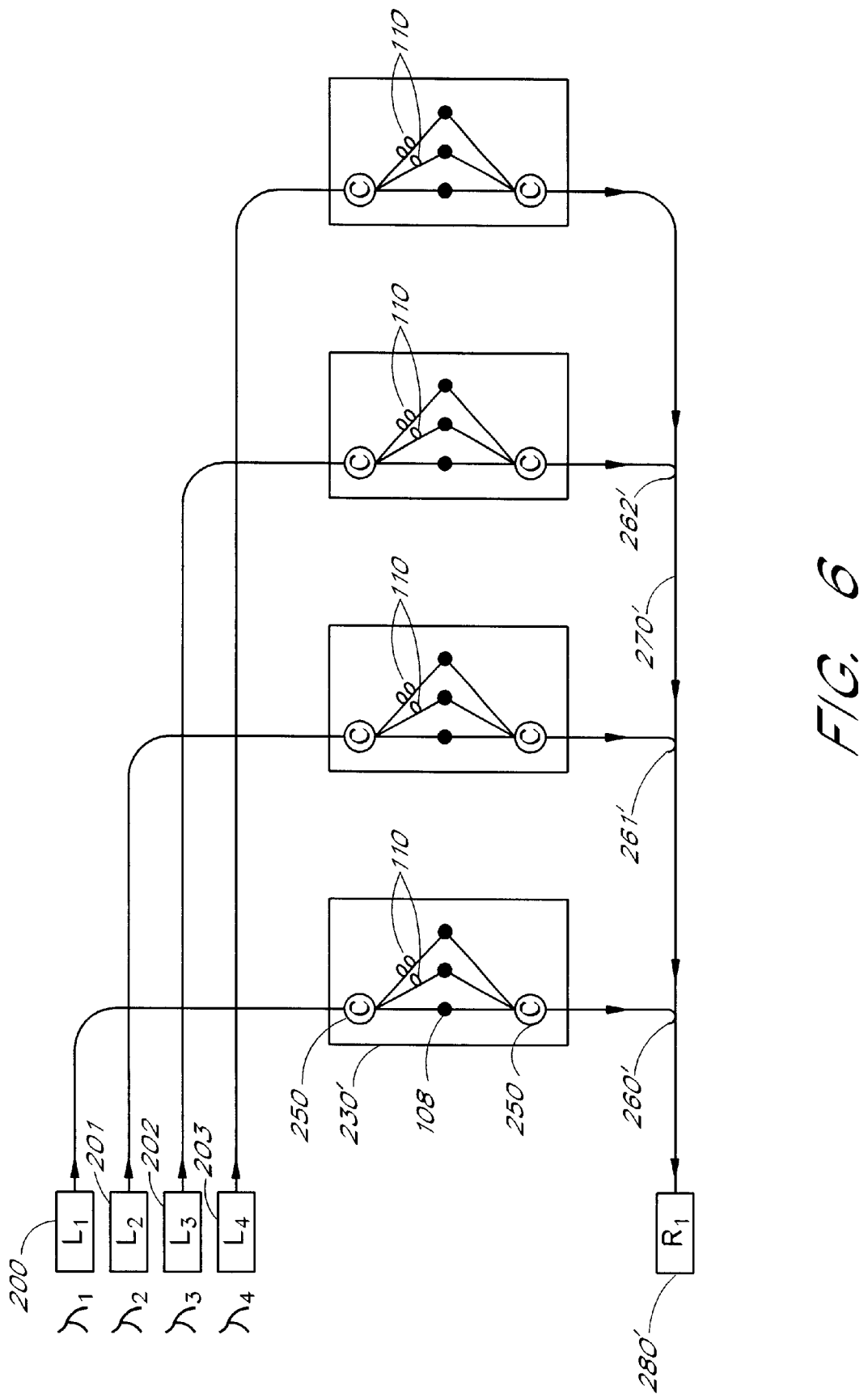
FIG. 6 illustrates another embodiment of the invention in which time division multiplexed sensor subarrays are connected to respective laser signal sources and a common signal return bus.
Figure 8:
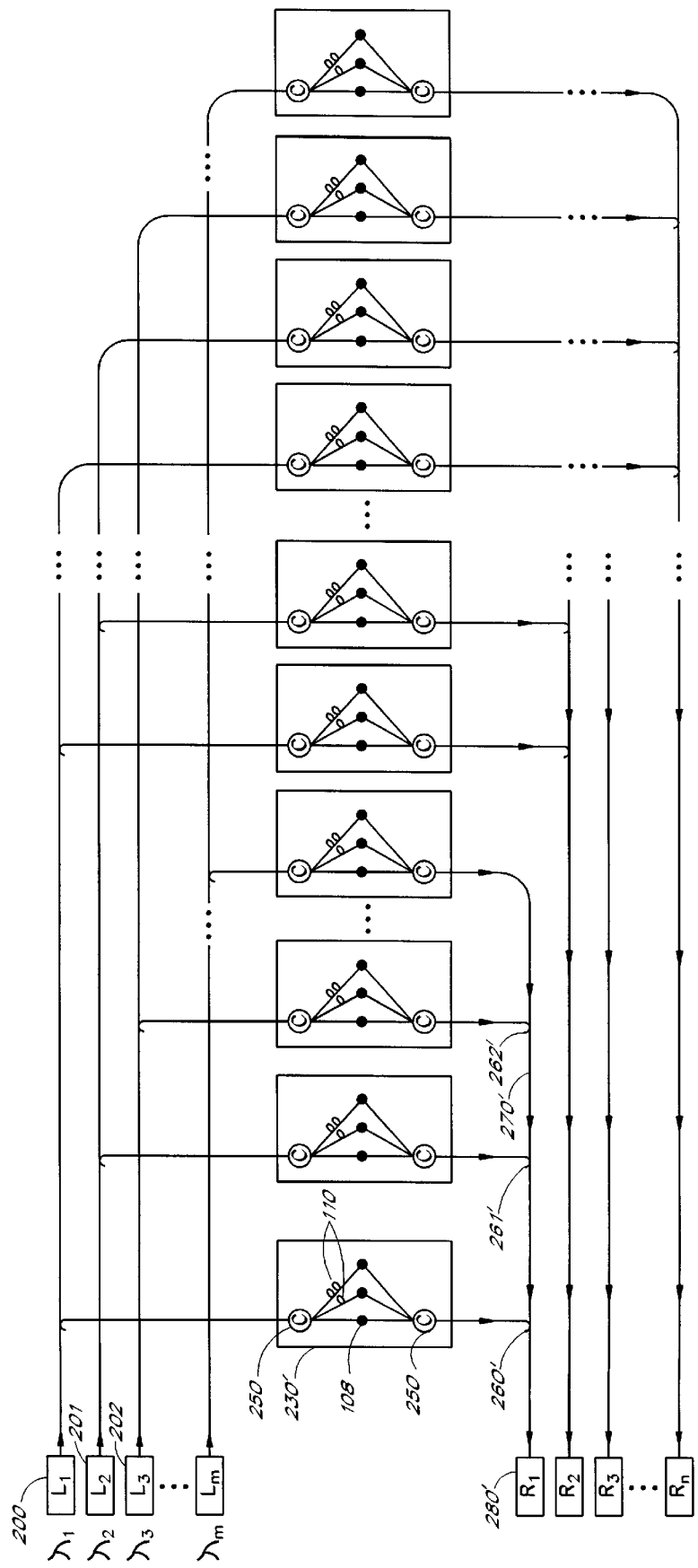
FIG. 8 illustrates a generalization of the topology illustrated in FIG. 2.

In FIG. 6, output signals from each of four signal sources 200, 201, 202, 203 are fed directly into four coupler subarrays 230' which may be star-coupled or ladder-based arrays. In this case, the subarrays 230' may advantageously comprise up to 128 sensors (see, for example, FIGS. 4A–4J). Only one return bus 270' and one receiver 280' are required, and DWDM couplers may be used as return couplers 260', 261', 262'. FIG. 8, on the other hand, illustrates how the 4×5 topology of FIG. 2 can be extended to an m×n topology. The subarrays 230' are illustrated as star coupled arrays, each of which comprises 3 sensors 108.

Figure 7B:
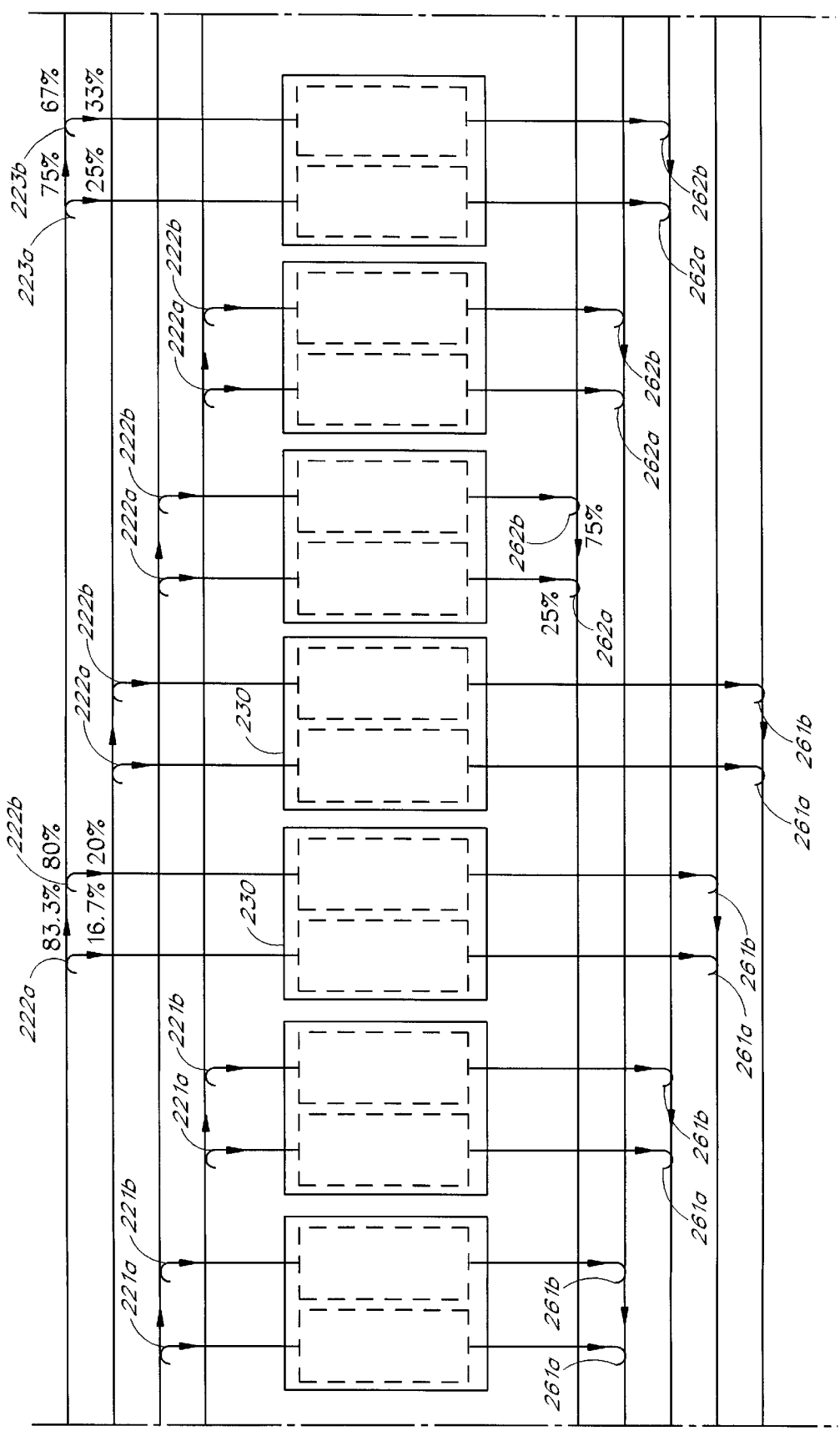
Figure 7C:
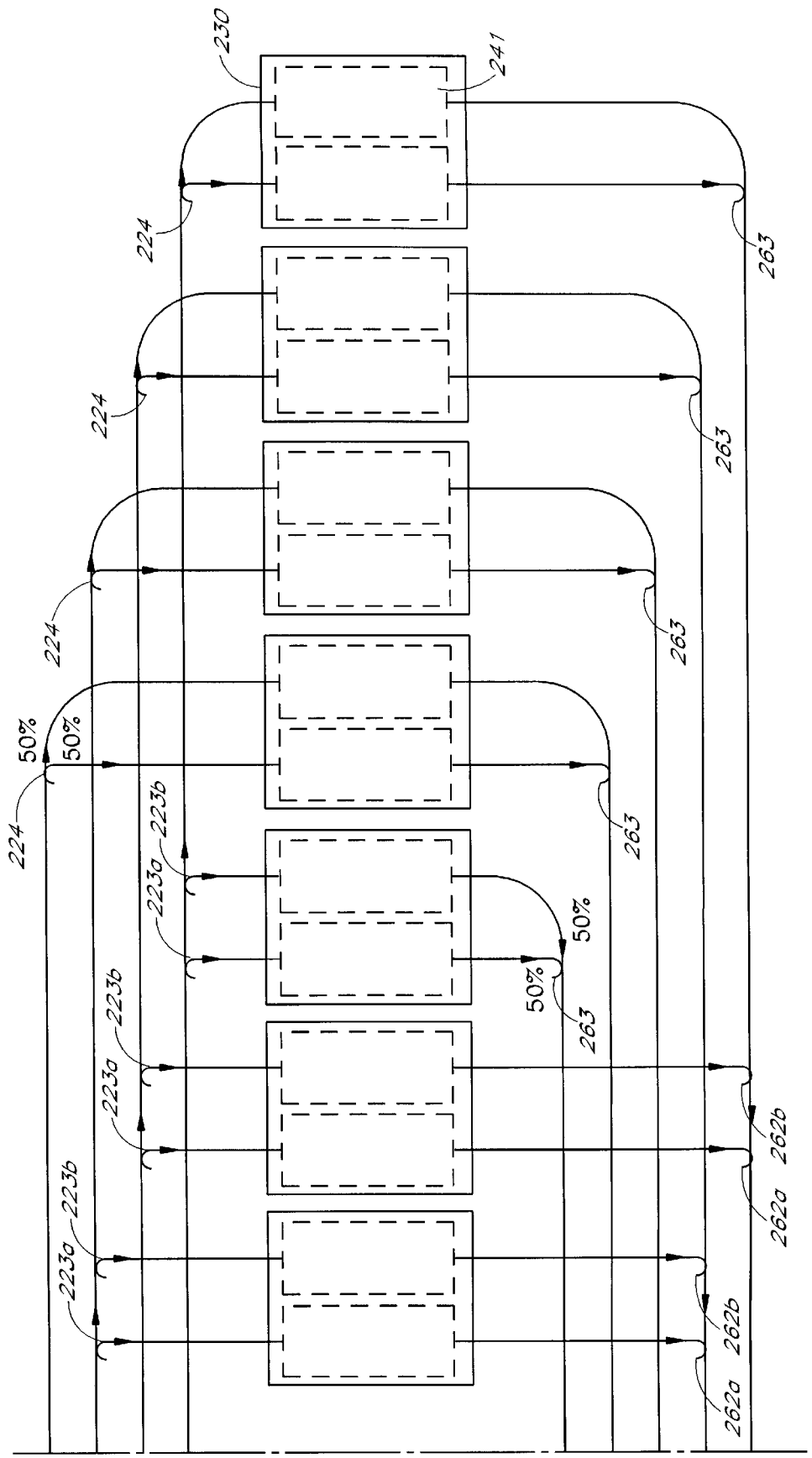

FIG. 7 illustrates an embodiment which is similar to FIG. 2, except that each sensor subarray 230 comprises two (or more) groups 241 of sensors, designated as 241-1 and 241-2. The embodiment of FIG. 7 may be advantageously employed if, for packaging reasons, the user desires to break up the subarray 230 into groups of sensors, with each group having its own input and output. It can be seen from FIG. 7 that each subarray 230 is connected to a unique combination of distribution bus 210, 211, 212, 213 and return bus 270, 271, 272, 273, 274. Further, although the number of subarrays 230 has not increased, the number of taps N (corresponding to the total number of groups 241-1 and 241-2) has increased. Thus, the coupling ratios in FIG. 7 are different from those of FIG. 2. The two groups 241-1 and 241-2 are shown in FIG. 7 as having adjacent taps, although the groups in a subarray 230 do not necessarily need to be tapped at adjacent locations on either the distribution bus 210–213. The taps are shown as couplers 220a, 220b; 221a, 221b; 222a, 222b: 223a, 223b; and 224 in the distribution bus, and as couplers 260a, 260b; 261a, 261b; 262a, 262b; and 263 in the return bus. Only one coupler 224 is needed at the distal end of the distribution bus 210–213, and only one coupler 263 is needed at the distal end of the return bus 270–274. When the number of taps N is large, it may be advantageous to use couplers that only approximate the ideal coupling percentage. For example, if there are 10 taps, the first three coupling ratios are 10%, 11%, and 12.5%. Rather than using three different coupling ratios, a single coupling ratio of, for example, 11% can be used for the three couplers with only a few percent deviation in the power coupled to each rung.

Figures 3, 3A:
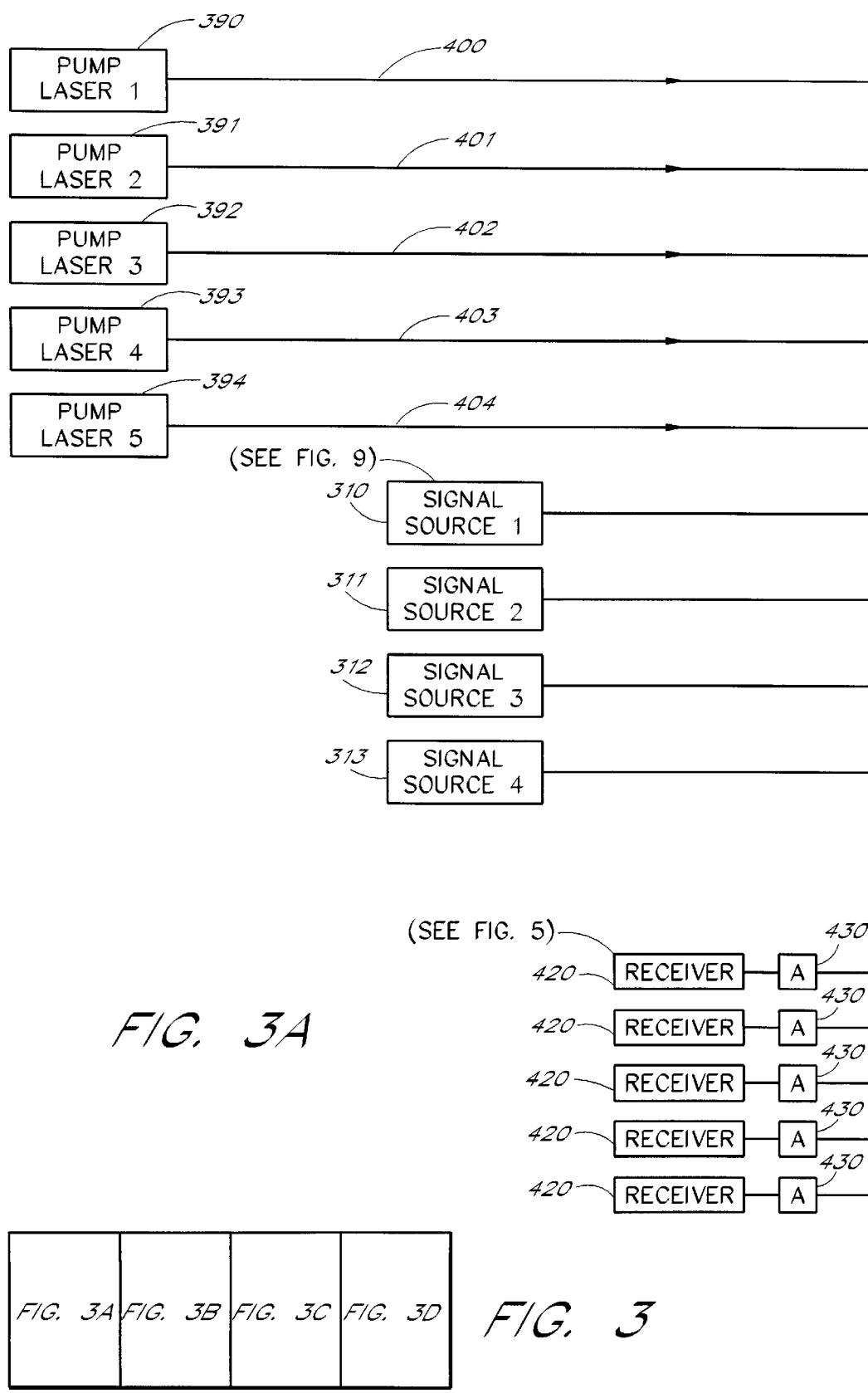
FIGS. 3, 3a–d, schematically illustrates an embodiment that incorporates time division multiplexing and wavelength division multiplexing features illustrated in FIGS. 1A–1F and 2, as well as the signal modulation features shown in FIG. 5.
Figure 3B:
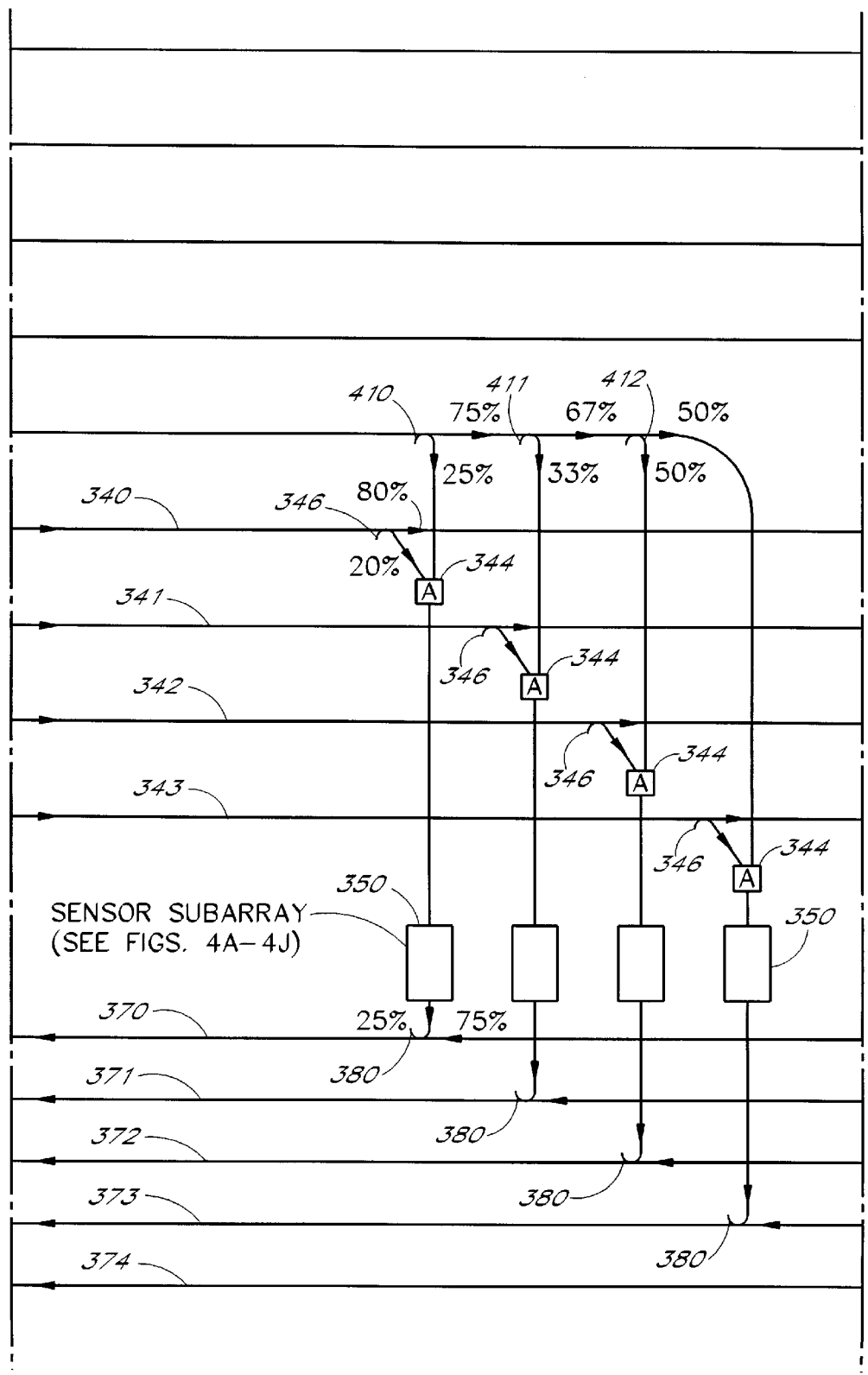
Figure 3C:
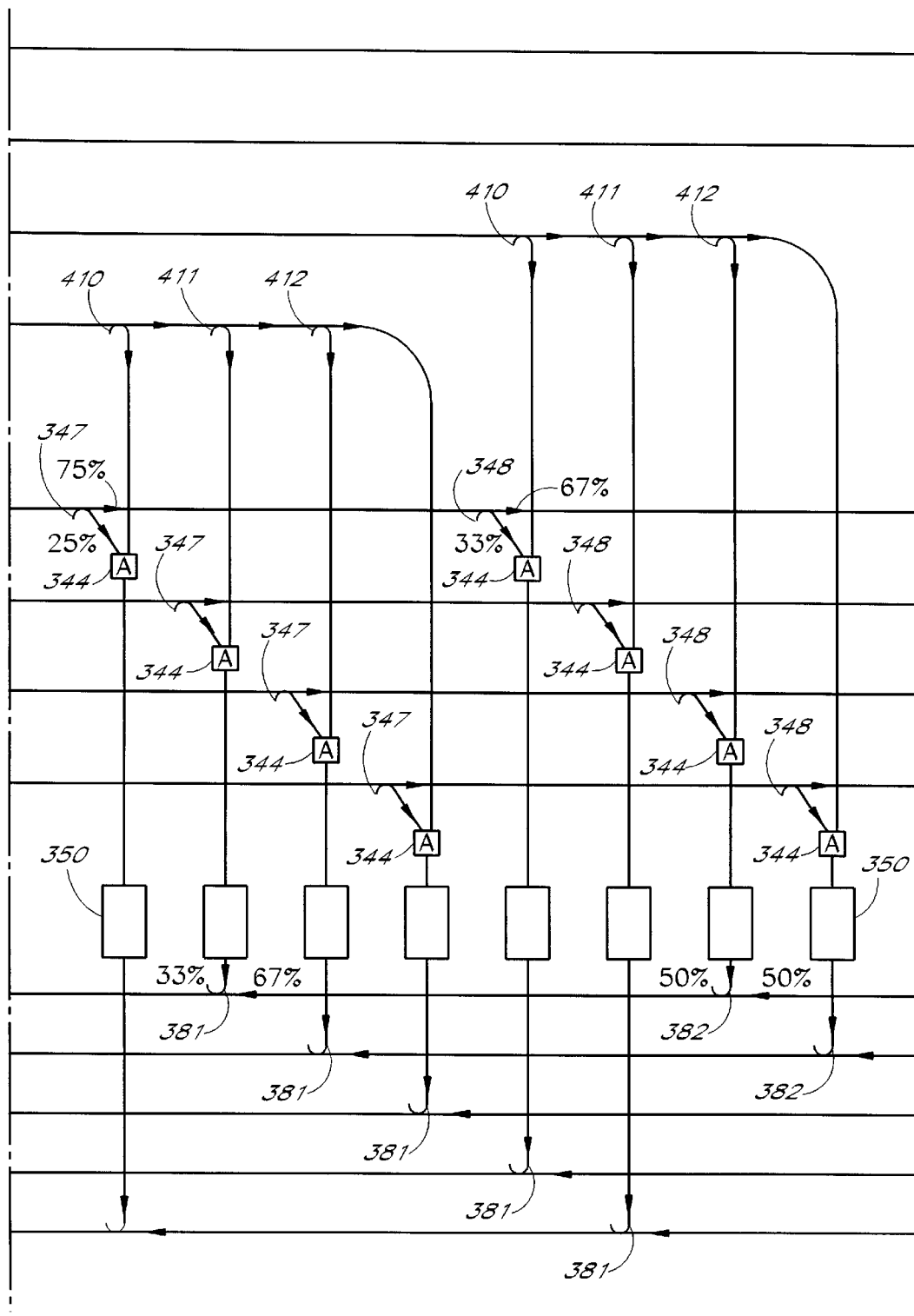
Figure 3D:
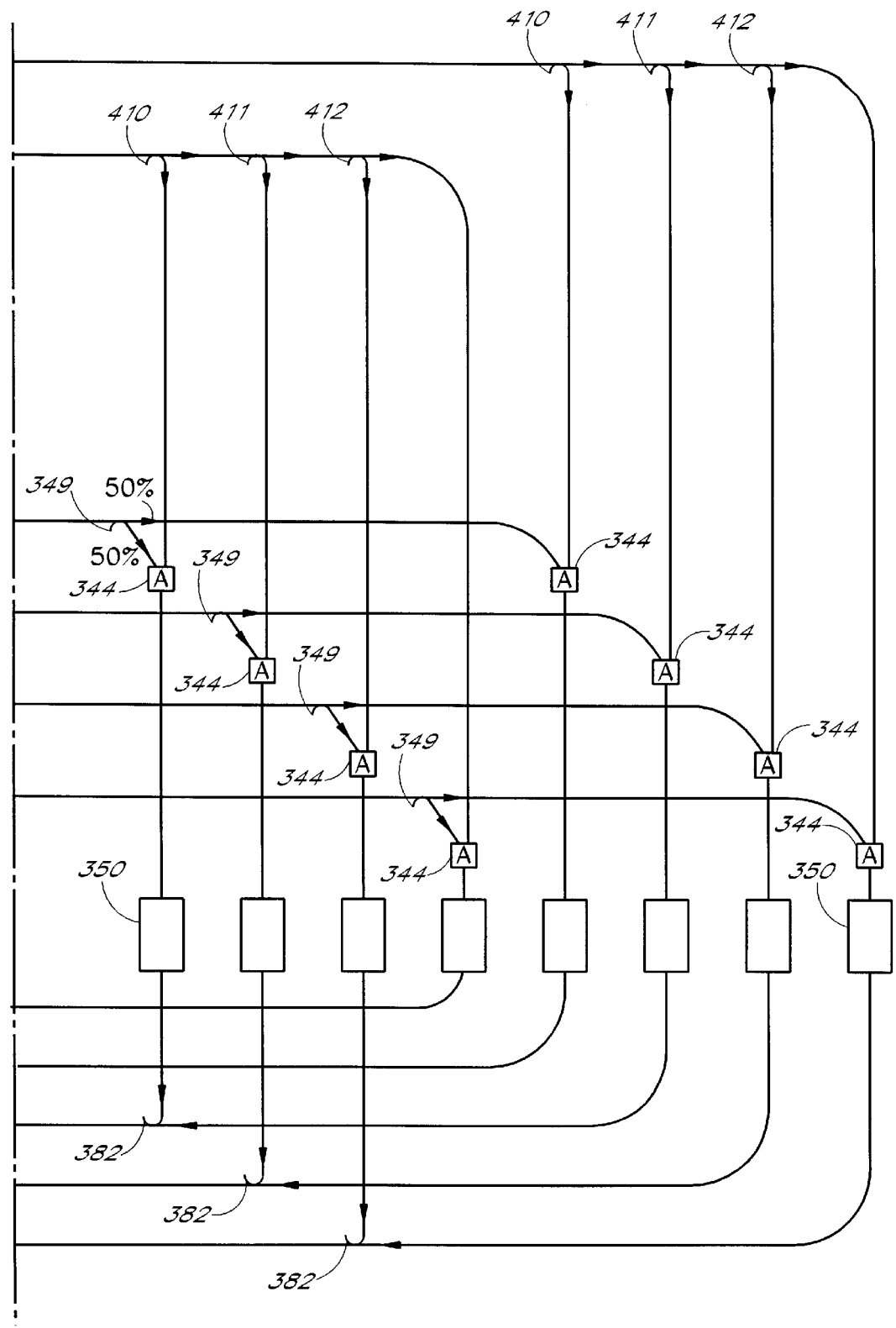

Another embodiment of the invention shown in FIG. 3 incorporates the amplifier configuration of the embodiments shown in FIGS. 1A–1F, as well as the time division multiplexing and wavelength division multiplexing features of the embodiment shown in FIG. 2. A plurality of signal sources 310, 311, 312, 313 generate respective optical signals at different wavelengths. Preferred configurations of the signal sources 310–313 are shown in FIGS. 9A, 9B, 9C, and 9D, which are discussed below. The optical signals from the signal sources 310, 311, 312, 313 enter respective signal distribution buses 340, 341, 342, 343. The signal distribution buses 340, 341, 342, and 343 are coupled via distribution couplers 346, 347, 348, 349 to optical amplifiers 344 positioned along respective rungs. The amplifiers 344 boost the strength of the optical signals before they enter respective sensor subarrays 350 (see FIGS. 4A–J), which may be, for example, star coupled arrays or ladder arrays.

In the embodiment of FIG. 3, five sensor subarrays 350 are optically connected to each of the signal sources 310, 311, 312, 313. The couplers that are further removed (in the optical path sense) from the signal sources 310, 311, 312, 313 direct greater fractions of the input optical signal towards the sensors subarrays 350. Thus, in this embodiment, the coupler fraction increases from 20% (coupler 346) to 25% (coupler 347), 33% (coupler 348), and 50% (coupler 349), respectively. Again, the last direct connection is effectively a 100% coupler. If there are N taps, then the ideal coupling fraction of the $i^{th}$ coupler (excluding excess losses) is $C_i=1/(N-i+1)$. However, as discussed above, when the number of taps N is large, it may be advantageous to use couplers that only approximate the ideal coupling percentage.

The amplifiers 344 are pumped with a plurality of pump lasers 390, 391, 392, 393, 394 coupled to a plurality of pump distribution buses 400, 401, 402, 403, 404. The amplifiers 344 are coupled to the pump distribution buses 400, 401, 402, 403, 404 via a plurality of couplers 410, 411, 412 that function much like their counterparts 346, 347, 348, 349 in the signal distribution buses 340, 341, 342, 343. The coupling fractions of the pump couplers 410, 411, 412 likewise increase with increasing optical distance from the pump lasers 390, 391, 392, 393, 394, so that substantially equal power is distributed to each of the amplifiers 344. The coupling fractions of the couplers 380, 381, 382 in the return distribution buses 370, 371, 372, 373, 374 are chosen so that the relative strengths of the return (output) perturbed optical signals are roughly equal to each other, as indicated in FIG. 3. Thus, as discussed above, if there are N taps, the ideal coupling fraction of the $i^{th}$ coupler (excluding excess losses) is $C_i=1/(N-i+1)$.

By using λ-add couplers on the return fibers 370–374, as illustrated in FIG. 10, coupling efficiencies may be increased and optical losses correspondingly reduced. A λ-add coupler is a wavelength division multiplexed coupler having first and second input ports and at least one output port. The first input port is a broadband port which couples substantially all the input light (except light in the band coupled by the second input port) to the output port with very low loss across a wide range of wavelengths. The second input port is a narrowband port which couples light within a narrow range of wavelengths to the output port. As illustrated in FIG. 10, the return bus is connected from rung to rung via the first input port and the output port of each λ-add coupler, and each rung is coupled to the return bus via the second input port of the respective λ-add coupler. The λ-add coupler at each rung is optimized for the wavelength applied to that rung. Thus, at each λ-add coupler, the light in the return bus at any of the wavelengths (i.e., at $\lambda_1, \lambda_2, \lambda_3, \lambda_4$) propagates from the first input port to the output port with relatively low loss, and the light in the rung at the selected wavelength is coupled from the second input port to the output port to add to the light already on the return bus. Because the λ-add coupler is wavelength dependent on the second port, the λ-add coupler acts as a filter to block light at other wavelengths in a particular rung. For example, at a λ-add coupler optimized for $\lambda_2$, light in a rung at the wavelength $\lambda_2$ is coupled to the return bus, and light in the rung at the wavelengths $\lambda_1, \lambda_3, \lambda_4$ is blocked from being coupled to the return bus. Likewise, light at the wavelength $\lambda_2$ is not passed from the first input port to the output port.

Figure 5:
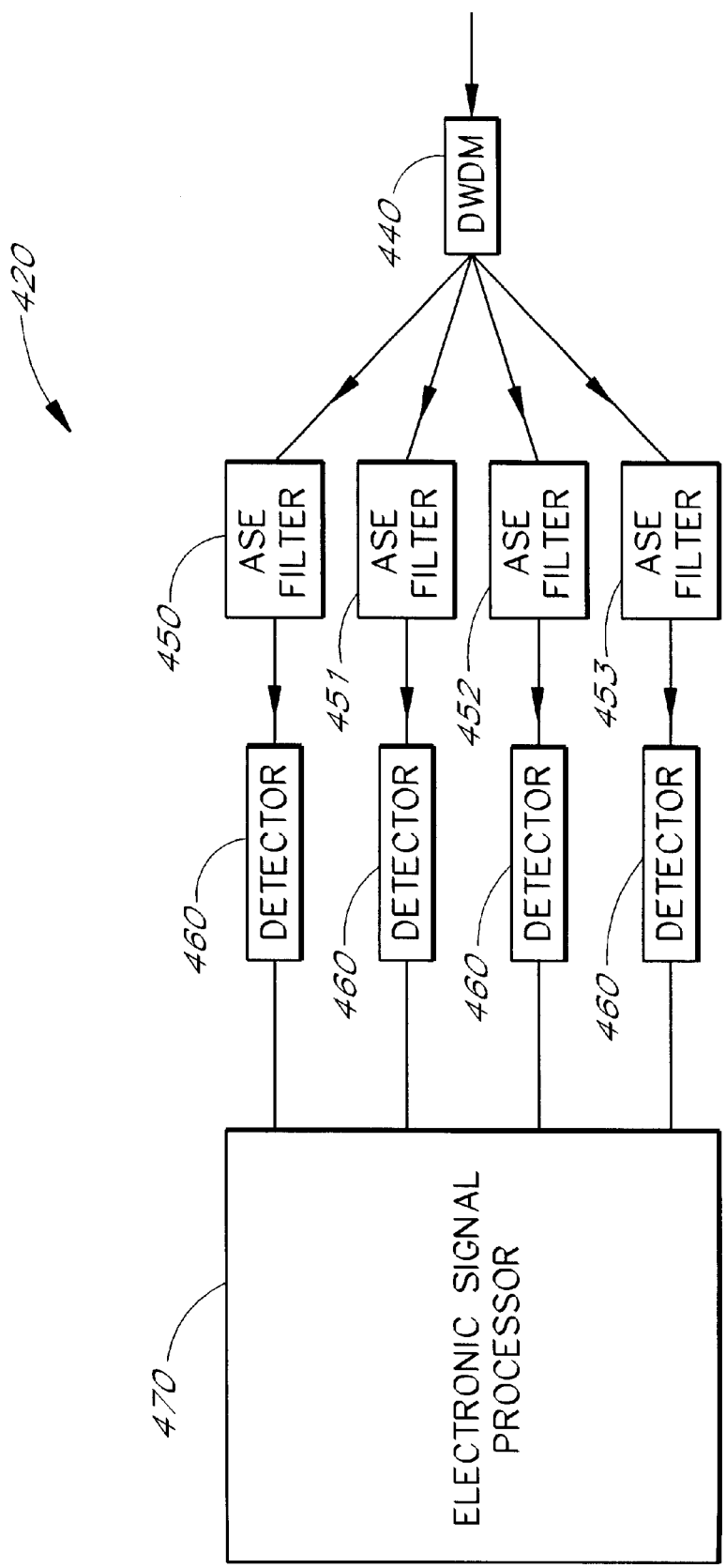
FIG. 5 illustrates the signal processing functions of the receivers shown in FIG. 3.

The output optical signals are detected by a plurality of receivers 420 via a plurality of optical amplifiers 430. A preferred receiver 420 is shown in more detail in FIG. 5. The receiver 420 preferably includes a dense wavelength division multiplexer (DWDM) 440 for demultiplexing the different return optical wavelengths originating from the signal sources 310–313. The demultiplexed return optical signals are directed through respective bandpass filters 450, 451, 452, 453 (such as ASE filters or Fabry-Perot interferometers) before entering respective detectors 460, the outputs of which enter an electronic signal processor 470. The bandpass filters 450, 451, 452, 453 filter out optical radiation at wavelengths other than the wavelength of interest, thereby improving the signal/noise ratio. Bandpass filters may also be advantageously incorporated into the receivers 280, 281, 282, 283, 284 of FIG. 2 and in conjunction with the detector 148 of FIGS. 1A–1F.

Figure 11B:
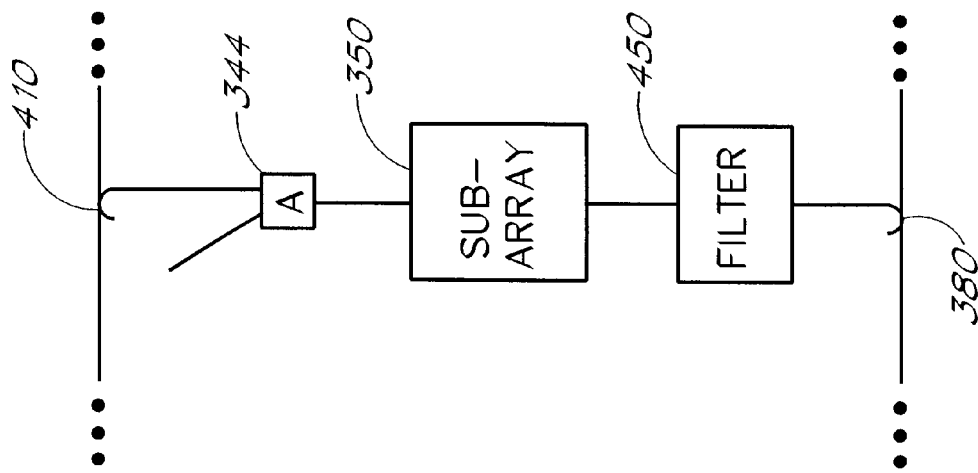
FIGS. 11A and 11B illustrate how an optical filter, such as an amplified spontaneous emission (ASE) filter, can be placed at various points along a rung in a sensor array.
Figure 11A:
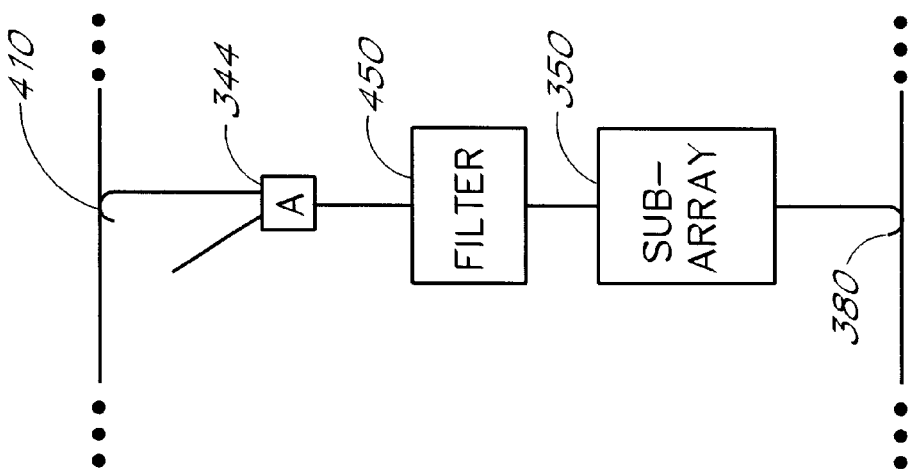

Further, as illustrated in FIGS. 11A and 11B, bandpass filters may be incorporated into the rungs within the optical sensor architecture. In FIG. 11A, a bandpass filter 450 is located between the amplifier 344 and the sensor subarray 350, and in FIG. 11B, the bandpass filter 450 is located between the sensor subarray 350 and the return coupler 380. As discussed above in connection with FIG. 10, DWDM couplers may be used in the return fiber line. Such filters pass only a preselected wavelength, thereby acting as a filter.

As in the embodiments shown in FIGS. 1A–1F, placing the amplifiers 344 between the couplers 410, 411, 412 and the sensors 108 facilitates the use of separate signal distribution buses (340–343) and pump distribution buses (400–404), since the input optical signal and the pump energy can be input separately to the amplifiers 344. Although the signal distribution buses (340–343) and the pump distribution buses (400–404) may share the same fiber lines, using dedicated signal and pump fiber lines permits the use of standard couplers (346, 347, 348 and 410, 411, 412) dedicated for use at a single wavelength.

Further, in the embodiment of FIG. 3 (as in the embodiment of FIG. 2), adjacent subarrays 350 are preferably coupled to signal sources 310–313 of different wavelengths and to different return signal buses 370–374, so that the return, perturbed optical signals are wavelength division multiplexed within the return signal buses. Thus, each sensor subarray 350 is coupled to a unique combination of signal source (310–313) and return signal bus (370–374). By incorporating time division multiplexing and wavelength division multiplexing in this way, a greater number of sensors 108 can be integrated into a single acoustic sensing system.

The embodiment of FIG. 3 may comprise, for example, 400 sensors 108 (20 sensor subarrays 350, each of which comprises 20 sensors), although typical working embodiments may comprise anywhere from hundreds to 30,000 or more sensors. As in the embodiment of FIG. 1A, the length of optical fiber connecting the sensors 108 within each subarray preferably varies (e.g., delay coils 110 may be used) so that the output optical signals from the sensors are time division multiplexed within the return distribution buses 370, 371, 372, 373, 374. However, other multiplexing arrangements such as code division multiplexing may be used.

Figure 12:
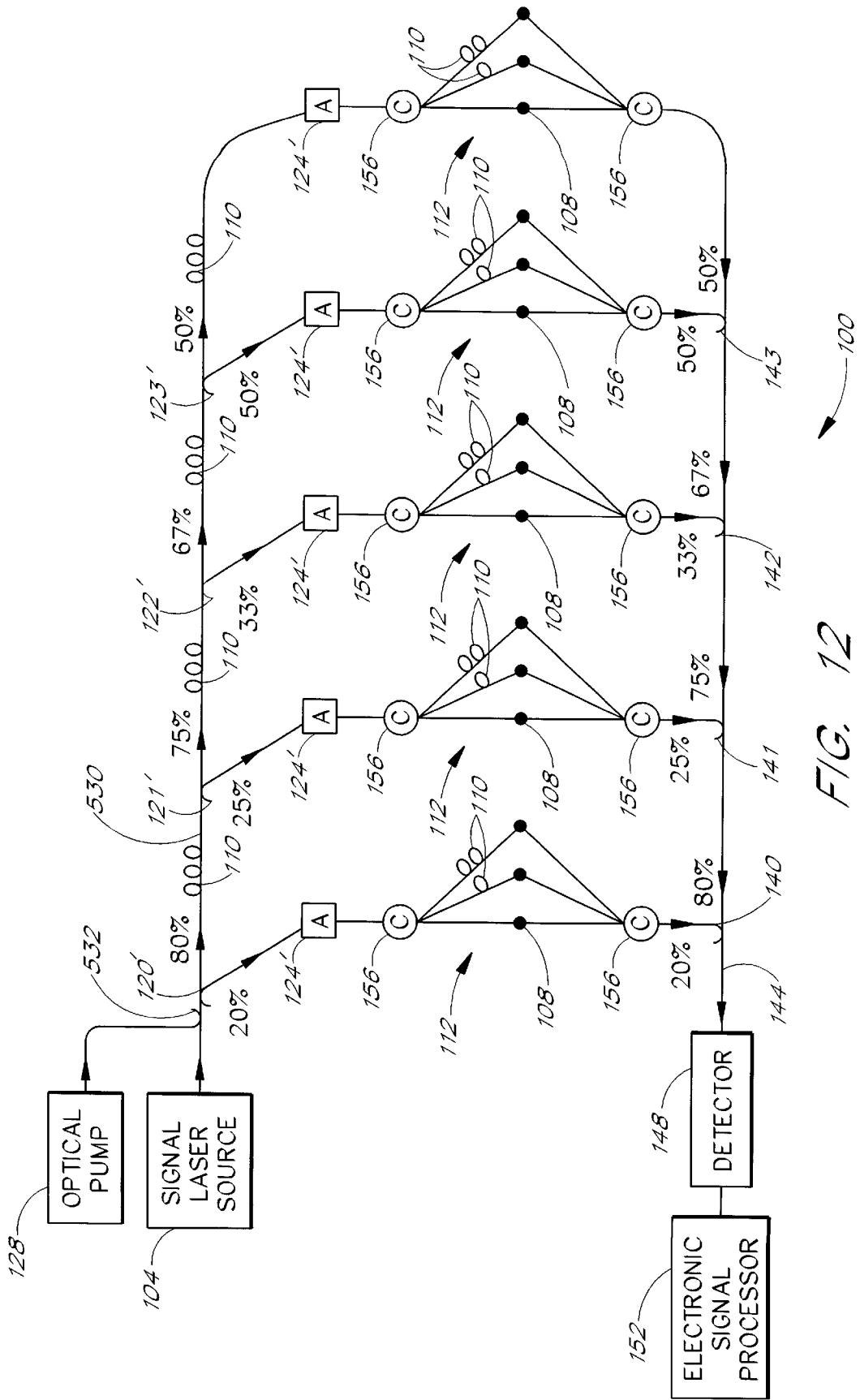
FIG. 12 illustrates an embodiment of the invention in which optical amplifiers and time division multiplexed sensor subarrays are placed along rungs that connect a return distribution bus with a fiber that acts as both a signal distribution bus and a pump distribution bus.

FIG. 12 illustrates an embodiment in which a fiber 530 acts as both the signal distribution bus and the pump distribution bus, but which is otherwise similar to the embodiment of FIG. 1A. A WDM coupler 532 may be used for coupling pump energy onto the fiber 530. In this case, couplers 120', 121', 122', and 123' provide nominally the same coupling ratio at the signal and pump wavelengths. The pump signal and optical signal propagate towards amplifiers 124', which differ from their counterparts 124 in FIGS. 1A, 1B, 1C, 1E in that each amplifier 124 has a pump-signal WDM therein (not shown), whereas each amplifier 124' (in the case of an erbium doped amplifier) may be simply a length of erbium doped fiber spliced into each rung. The optical amplifiers 124' are distributed at selected positions along the rungs to maintain the power of the input optical signal at an adequate level for each sensor subarray 112. The sensor subarray 112 may advantageously comprise subarrays such as those illustrated in FIGS. 4A–4J.

One skilled in the art will appreciate that the topologies of FIGS. 3 and 10 may be modified such that an equal number of optical pumps and signal sources are used, with each of the optical pumps being paired with a respective signal source, and these pairs being assigned a respective common distribution fiber. Couplers distributed along such distribution fibers could advantageously be designed to provide nominally the same coupling ratio at the signal and pump wavelengths.

Figure 4J:
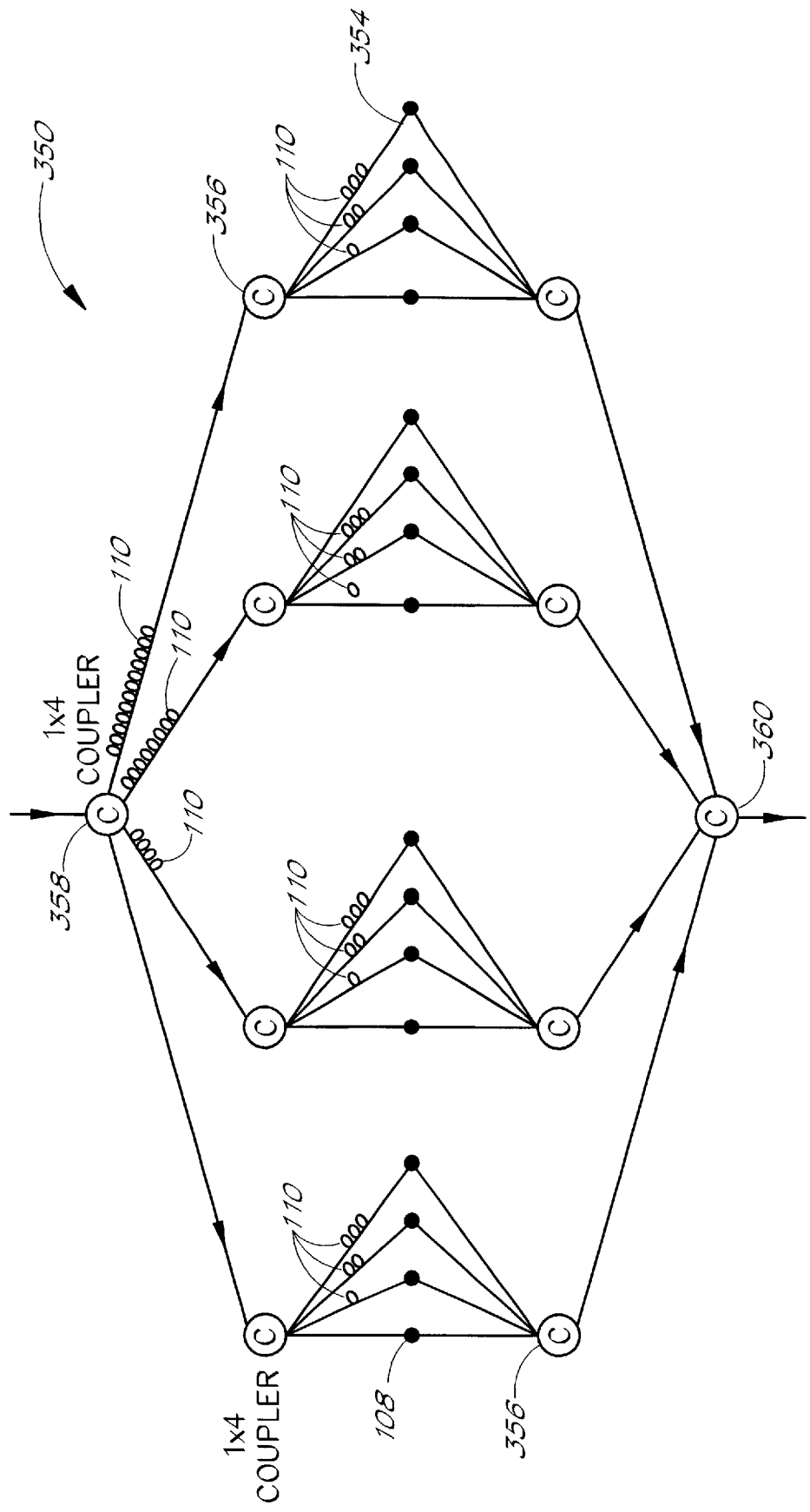

FIGS. 4A–4J show a variety of sensor subarrays that may be utilized with the embodiments described herein. In FIG. 4A, the subarray comprises a single sensor 108. FIGS. 4B and 4C show feed backward embodiments that include 2 and 3 sensors 108, respectively, in which delay coils 110 are used to ensure that the optical signals are properly time division multiplexed within the sensor subarrays. FIG. 4D shows a 3-sensor embodiment of the feed forward type, and FIG. 4E shows a star coupler embodiment. FIGS. 4F and 4G show feed backward and feed forward embodiments, respectively, that include a large number of sensors 108, e.g., up to 16 or more sensors 108 may be used. FIGS. 4H and 4I show feed backward and feed forward embodiments, respectively, which include a plurality of sensor subarrays 109, each of which includes a plurality of sensors 108, e.g., up to 128 or more sensors 108 may be used.

FIG. 4J comprises 16 sensors 108 arranged in four groups, with the sensors 108 coupled at their respective inputs and outputs to 1×4 couplers 356. (Couplers are not shown explicitly in FIGS. 4A–4I.) The 1×4 couplers 356 are in turn preferably connected to 1×4 couplers 358 and 360, with the coupler 358 being tied to one of the amplifiers 344. The sensor subarrays of FIGS. 4A–4J are coupled to a signal distribution bus and to a return bus, and if the sensor architecture utilizes optical amplifiers, to a pump distribution bus as well. The couplers on the return bus may be standard couplers, as illustrated for example in FIG. 3, or the couplers may be, for example, DWDM couplers.

Figure 9A:
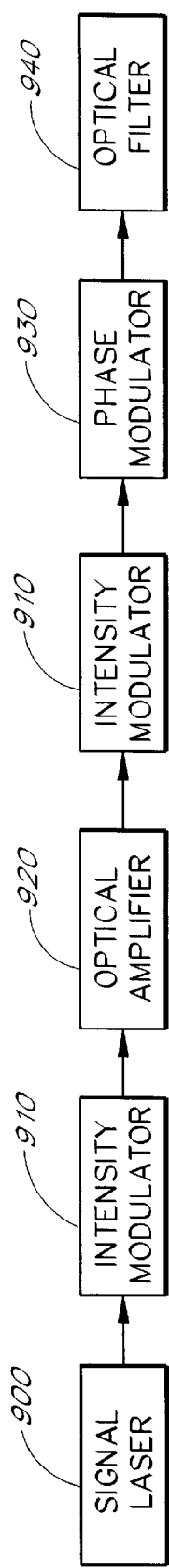
FIGS. 9A, 9B, 9C, and 9D illustrate preferred embodiments of signal sources.

FIGS. 9A, 9B, 9C, and 9D illustrate preferred embodiments of the signal sources 104, 200–203, and 310–313. In each case, a signal laser generates the light. In FIG. 9A, the output from a signal laser 900 passes through two intensity modulators 910 separated by an optical amplifier 920. The modulators 910 act to produce bursts of optical radiation separated by time intervals during which essentially no optical radiation is produced. The distal modulator 910 substantially eliminates signal (optical) noise which would otherwise appear during time intervals between optical pulses and thus substantially improves the signal to noise ratio at the receiver. The light then passes through a phase modulator 930 and an optical filter 940, e.g., an amplified spontaneous emission (ASE) filter or a Fabry-Perot interferometer. The optical filter 940 substantially eliminates optical radiation at wavelengths other than the wavelengths of interest, namely, the wavelengths generated by the signal laser 900, resulting in intense, narrow bandwidth optical signals.

Figure 9D:
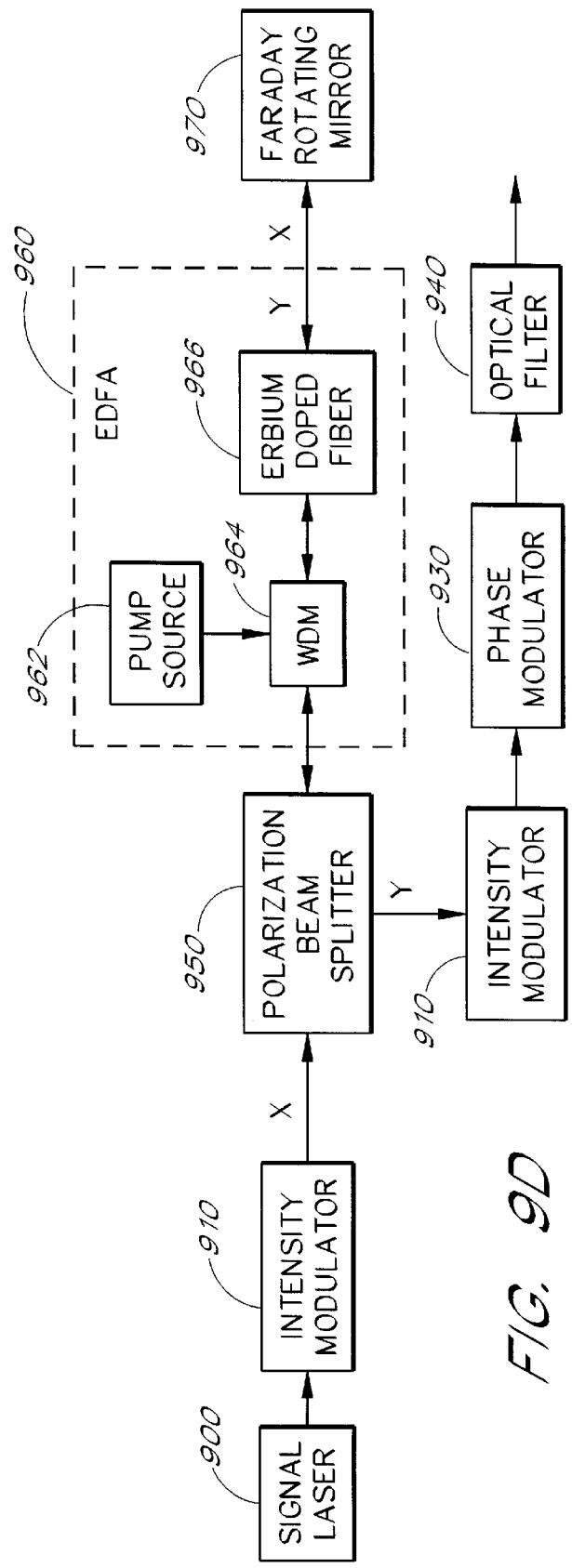
Figure 9B:
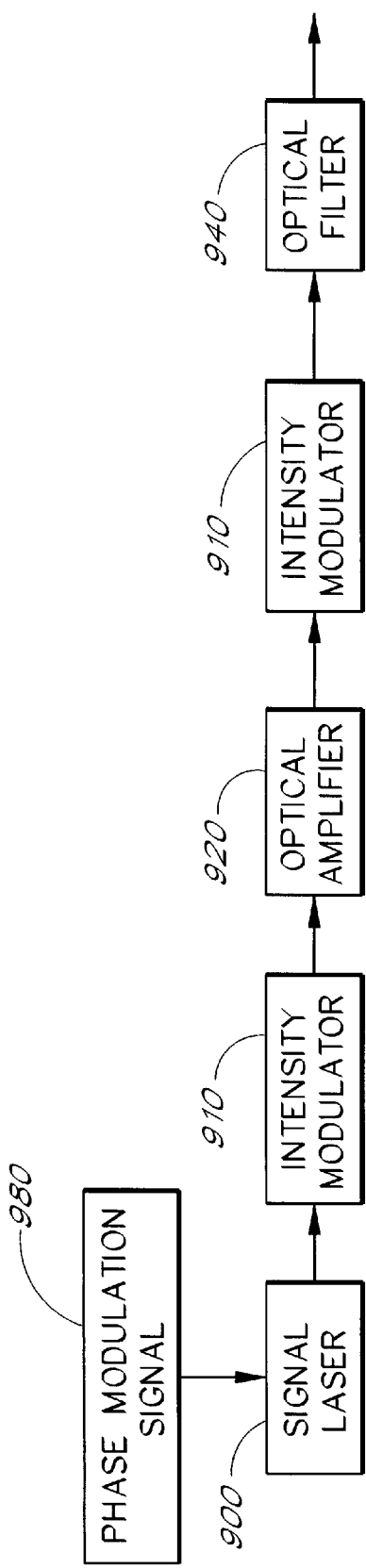

In FIG. 9B, phase modulation is applied to the laser 900 directly. A phase modulation signal 980 is applied to the laser 900, whose output passes through a first intensity modulator 910, an optical amplifier 920, a second intensity modulator 910, and an optical filter 940.

Figure 9C:
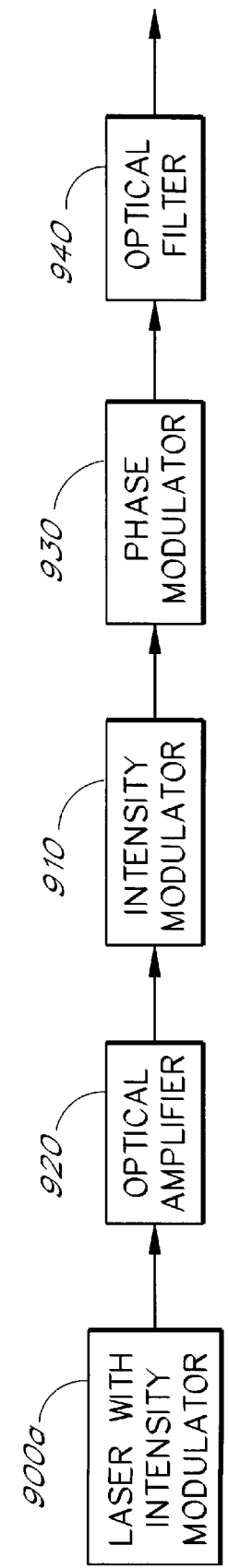

In FIG. 9C, a laser 900a has a built-in intensity modulator, with the output of the laser 900a being directed through an optical amplifier 920, a second intensity modulator 910, a phase modulator 930, and an optical filter 940.

In FIG. 9D, output from a signal laser 900 (which is taken to be polarized along the "x" axis) is directed through an intensity modulator 910 and into a polarization beam splitter 950. The beam splitter 950 only passes photons aligned along the x-axis into a fiber amplifier 960. The fiber amplifier 960 may advantageously comprise a pump source 962 whose output is coupled via a wavelength division multiplexer 964 into a segment of doped fiber 966 (e.g., erbium-doped fiber). The output from the fiber amplifier 960 is directed towards a Faraday rotating mirror 970 which rotates the polarization of the light so that upon reflection it is aligned along the "y" axis, i.e., perpendicular to the x-axis (along which output from the signal laser 900 is aligned). The reflected photons pass through the fiber amplifier 960 and are reflected by the beam splitter 950 towards a second intensity modulator 910. After passing through the second intensity modulator 910, the light passes through a phase modulator 930 and an optical filter 940.

The intensity modulator 910 is preferably designed to pass only one state of polarization. For this reason, the optical amplifier 920 of FIGS. 9A, 9B, 9C preferably includes polarization maintaining (PM) fiber (e.g., erbium-doped PM fiber), or alternatively, the polarization of the light is controlled by other means (not shown) within the signal source. In FIG. 9D, the random birefringence that builds up in the first pass through the amplifier 960 is exactly canceled in the second pass. Accordingly, substantially all of the light is passed through the second intensity modulator 910 located on the output side of the polarization beam splitter 950 (resulting in low loss), and thus, the amplifier 960 can use non-PM fiber.

As discussed above in connection with FIG. 10, when λ-add couplers are used to couple light from the rungs to the return bus, the λ-add couplers are wavelength selective. Thus, the λ-add couplers of FIG. 10 perform the filter functions and may therefore be advantageously used to eliminate the need for the ASE filters shown in FIGS. 9A–9D.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. A sensor array, comprising:
   a plurality of distribution fiber lines for distributing respective input optical signals, the respective input optical signals having different wavelengths;
   a plurality of return fiber lines for returning perturbed optical signals; and
   a plurality of sensor subarrays, each subarray having a respective input and a respective output, each input coupled to a respective one of said distribution fiber lines, each output coupled to a respective one of said return lines, each subarray comprising a plurality of sensors, each sensor in a respective subarray receiving the respective input optical signal from the same distribution fiber line and outputting perturbed optical signals to the same return fiber line, the respective input and output of each subarray being coupled to a unique combination of distribution and return fiber lines.

2. The sensor array of claim 1, wherein the number of sensors per subarray is between 2 and 4.

3. A sensor array, comprising:

plurality of distribution fiber lines for distributing respective input optical signals, the respective input optical signals having different wavelengths;

a plurality of return fiber lines for returning perturbed optical signals;

a plurality of sensor subarrays having respective inputs and outputs, each of said subarrays comprising a plurality of sensors that receive the input optical signals and that output the perturbed optical signals, each of said inputs being coupled to one of said distribution fiber lines, each of said outputs being coupled to one of said return lines, and each of said subarrays being coupled to a unique combination of distribution and return fiber lines;

a plurality of optical amplifiers, wherein each of said amplifiers is located between one of said distribution lines and one of said inputs; and a plurality of pump distribution lines connected to said inputs for distributing pump energy to said amplifiers.

4. A sensor array, comprising:

a plurality of distribution fiber lines for distributing respective input optical signals, the respective input optical signals having different wavelengths;

a plurality of return fiber lines for returning perturbed optical signals;

a plurality of sensor subarrays having respective inputs and outputs, each of said subarrays comprising a plurality of sensors that receive the input optical signals and that output the perturbed optical signals, each of said inputs being coupled to one of said distribution fiber lines, each of said outputs being coupled to one of said return lines, and each of said subarrays being coupled to a unique combination of distribution and return fiber lines;

a plurality of optical amplifiers, wherein each of said amplifiers is located between one of said distribution lines and one of said inputs; and a plurality of optical pump sources connected to said inputs for supplying pump energy to said amplifiers.

5. A sensor array, comprising:

a plurality of distribution fiber lines for distributing respective input optical signals, the respective input optical signals having different wavelengths;

a plurality of return fiber lines for returning perturbed optical signals;

a plurality of sensor subarrays having respective inputs and outputs, each of said subarrays comprising a plurality of sensors that receive the input optical signals and that output the perturbed optical signals, each of said inputs being coupled to one of said distribution fiber lines, each of said outputs being coupled to one of said return lines, and each of said subarrays being coupled to a unique combination of distribution and return fiber lines, wherein the perturbed optical signals from each of said subarrays are time division multiplexed.

6. The sensor array of claim 1, wherein said subarray has multiple input connections and multiple output connections.

7. The sensor array of claim 1, wherein said subarray has a single input connection and a single output connection.

8. A sensor array, comprising:

a plurality of distribution fiber lines for distributing respective input optical signals, the respective input optical signals having different wavelengths;

a return fiber line for returning perturbed optical signals; and a plurality of sensor subarrays, each subarray having a respective input and a respective output, each of said inputs being coupled to a respective one of said distribution fiber lines, each of said outputs being coupled to said return line, each subarray comprising a plurality of sensors, each sensor in a respective subarray receiving the respective input optical signal from the same distribution fiber line and outputting perturbed optical signals to said return fiber line, the respective input of each subarray being coupled to a unique distribution fiber line.

9. A sensor array, comprising:

a plurality of distribution fiber lines for distributing respective input optical signals, the respective input optical signals having different wavelengths;

a return fiber line for returning perturbed optical signals; and a plurality of sensor subarrays having respective inputs and outputs, each of said subarrays comprising a plurality of sensors that receive the input optical signals and output the perturbed optical signals, each of said inputs being coupled to one of said distribution fiber lines, each of said outputs being coupled to said return line, and each of said subarrays being coupled to a unique distribution fiber line, wherein each of said subarrays outputs time division multiplexed perturbed optical signals.

10. A method of distributing an input optical signal to a plurality of sensors, comprising:

providing a first plurality of sensors having respective inputs and outputs;

connecting a first plurality of input couplers to the inputs of the sensors via respective optical amplifiers;

connecting the input couplers to a first distribution fiber line which carries an input optical signal;

connecting a first plurality of output couplers to the outputs of the sensors;

connecting the output couplers to a first return fiber line; and amplifying the input optical signal provided to the inputs of the sensors to compensate for reduced optical power.

11. An optical sensor architecture comprising:

a plurality of sensors which receive an input optical signal and which output perturbed optical signals;

a distribution bus coupled to each sensor to distribute the input optical signal to each sensor;

a return bus coupled to each sensor to receive the perturbed optical signal from each sensor to be included as a portion of a return signal; and a plurality of optical amplifiers interposed between said distribution bus and said sensors to increase the power provided to each of said sensors.

12. The optical sensor architecture of claim 11, wherein each of said optical amplifiers comprises a portion of erbium-doped optical fiber.

13. An optical sensor architecture comprising:

a plurality of sensors which receive an input optical signal and which output perturbed optical signals;

a distribution bus coupled to each sensor to distribute the input optical signal to each sensor;

a return bus coupled to each sensor to receive the perturbed optical signal from each sensor to be included as a portion of a return signal; and a plurality of optical amplifiers interposed between said distribution bus and said sensors to increase the power provided to each of said sensors, wherein the perturbed optical signals are time division multiplexed.

14. The optical sensor architecture of claim 11, wherein each of said optical amplifiers is coupled to only one of said sensors.

15. The optical sensor architecture of claim 11, wherein each of said optical amplifiers is coupled to a subarray of said sensors.

16. The optical sensor architecture of claim 15, wherein said subarray includes 4–32 sensors.

17. An optical sensor architecture, comprising:

a plurality of means for sensing a parameter;

means for distributing a first optical signal to each of said means for sensing;

means for returning a second optical signal from each of said means for sensing; and a plurality of means for amplifying the first optical signal, said amplifying means located between said means for sensing and said means for distributing.

18. The architecture of claim 17, wherein each of said means for sensing comprises a plurality of sensors.

19. A method of distributing an input optical signal to a plurality of sensors in a sensor architecture to generate an optical output, comprising:

coupling an input optical signal from a distribution bus to a plurality of sensors;

amplifying the input optical signal after the input optical signal leaves the distribution bus but before the input optical signal enters the plurality of sensors;

generating output signals from the plurality of sensors; and coupling the output signal from each sensor into a return signal carried via a return bus which is coupled to each sensor.

20. The method of claim 19, wherein the plurality of sensors are arranged as an array of subarrays coupled between respective optical amplifiers and the return bus.

21. An optical sensor array architecture, comprising:

a distribution bus which receives and distributes an optical input signal;

a return bus which receives a plurality of optical return signals and provides the optical return signals as output signals;

a plurality of rungs coupled between said distribution bus and said return bus, each of said rungs comprising at least one sensor which receives a respective portion of the optical input signal and which generates one of the optical return signals; and a plurality of input optical amplifiers in said rungs responsive to a pump signal, said input optical amplifiers amplifying said optical input signal in said rungs to compensate for reduced signal power.

22. A modulator for an optical signal, comprising:

a first intensity modulator that receives and modulates an optical signal, said first intensity modulator producing intensity modulated output in the form of output pulses;

an optical amplifier that receives and amplifies the modulated output; and a second intensity modulator that receives the amplified modulated output, said second intensity modulator modulating the amplified modulated output by substantially eliminating optical noise produced by said amplifier during time intervals between the optical pulses.

23. A sensor array, comprising:

a first optical source and a second optical source that generate respective first and second optical signals at respective first and second wavelengths, the first and second wavelengths being different;

first and second optical amplifiers that receive the first and second optical signals, respectively, said first and second amplifiers amplifying the first and second optical signals, respectively;

first and second bandpass filters that receive the first and second amplified optical signals, respectively, said first filter filtering out optical radiation generated by said first amplifier that is near the second wavelength, said second filter filtering out optical radiation generated by said second amplifier that is near the first wavelength, said first and second bandpass filters generating first and second filtered optical signals, respectively;

first and second sensors that receive the first and second optical signals, respectively, said first and second sensors outputting first and second perturbed optical signals in response to a stimulus; and a return bus that receives perturbed, filtered first and second optical signals and directs the first and second perturbed optical signals towards a receiver unit.

24. The sensor array of claim 23, wherein said bandpass filters are amplified spontaneous emission (ASE) filters.

25. The sensor array of claim 23, wherein said bandpass filters are Fabry-Perot interferometers.

26. The sensor array of claim 23, wherein said receiver unit comprises first and second detectors.

27. The sensor array of claim 23, wherein the stimulus is acoustical.

28. The sensor array of claim 23, wherein at least one of said bandpass filters is located in proximity with an optical source.

29. A sensor array, comprising:

a first optical source and a second optical source that generate respective first and second optical signals at respective first and second wavelengths, the first and second wavelengths being different;

first and second optical amplifiers that receive the first and second optical signals, respectively, said first and second amplifiers amplifying the first and second optical signals to generate first and second amplified optical signals, respectively;

first and second sensors that receive the first and second amplified optical signals, respectively, said first and second sensors outputting first and second amplified perturbed optical signals in response to a stimulus;

a return bus that receives the first and second perturbed optical signals and directs the first and second perturbed optical signals towards a receiver unit; and first and second bandpass filters, said first bandpass filter located at a point in said sensor array between said first amplifier and said return bus, said second bandpass filter located at a point in said sensor array between said second amplifier and said return bus, said first bandpass filter filtering out optical radiation generated by said first amplifier that is near the second wavelength and said second bandpass filter filtering out optical radiation generated by said second amplifier that is near the first wavelength.

30. The sensor array of claim 29, wherein said bandpass filters are amplified spontaneous emission (ASE) filters.

31. The sensor array of claim 29, wherein said bandpass filters are Fabry-Perot interferometers.

32. The sensor array of claim 29, wherein said receiver unit comprises first and second detectors.

33. The sensor array of claim 29, wherein the stimulus is acoustical.

34. The sensor array of claim 29, said first bandpass filter located at a point in said sensor array between said first amplifier and said first sensor.

35. The sensor array of claim 29, said first bandpass filter located at a point in said sensor array between said first sensor and said return bus.

36. An optical sensor architecture comprising:
   a plurality of sensor groups, each of said sensor groups comprising at least one sensor which receives an input optical signal and which outputs a perturbed optical signal;
   a distribution bus coupled to each of said sensor groups to distribute the input optical signal to each of said sensor groups, said distribution bus distributing a pump signal;
   a return bus coupled to each of said sensor groups to receive the perturbed optical signal from each of said sensor groups;
   a plurality of rungs connecting said distribution bus and said return bus, wherein said sensor groups are disposed along said rungs; and
   a plurality of optical amplifiers distributed at selected positions along said rungs, said amplifiers receiving the pump signal and maintaining the power of the input optical signal at an adequate level for each of said sensor groups.

37. The optical sensor architecture of claim 36, wherein each of said sensor groups comprises a plurality of sensors.

38. The optical sensor architecture of claim 36, wherein each of said sensor groups is formed by coupling respective first ends of each sensor comprising the respective sensor group and by coupling respective second ends of each sensor comprising the respective sensor group, said first ends being coupled to said amplifiers, said second ends being coupled to said return bus.

39. The optical sensor architecture of claim 38, wherein a star fiber coupler couples the first end of each sensor of each respective sensor group and a star fiber coupler couples the second end of each sensor of each respective sensor group.

40. The optical sensor architecture of claim 36, wherein a length of a fiber path from said distribution bus through each sensor within a single sensor group to said return bus is different for each sensor within each respective sensor group.

41. The optical sensor architecture of claim 36, wherein each of said sensor groups is disposed along a respective one of said rungs.

42. The sensor array of claim 3, further comprising a plurality of optical pump sources connected to said inputs for supplying pump energy to said amplifiers.

* * * * *